(12) United States Patent
Hannuki et al.

(10) Patent No.: US 6,917,392 B2
(45) Date of Patent: Jul. 12, 2005

(54) LIQUID CRYSTAL DISPLAY APPARATUS OF A LATERAL DIRECTION ELECTRIC FIELD DRIVE TYPE

(75) Inventors: Takahisa Hannuki, Tokyo (JP); Shinichi Nishida, Tokyo (JP); Satoshi Ihida, Tokyo (JP); Shouichi Kuroha, Tokyo (JP); Ryuji Takahashi, Akita (JP); Satoshi Miura, Akita (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 283 days.

(21) Appl. No.: 09/738,530

(22) Filed: Dec. 15, 2000

(65) Prior Publication Data

US 2001/0040646 A1 Nov. 15, 2001

(30) Foreign Application Priority Data

Dec. 22, 1999 (JP) .......................... 11-364544
Oct. 20, 2000 (JP) ...................... 2000-321784

(51) Int. Cl.[7] ............................. G01F 1/136
(52) U.S. Cl. ......................... 349/43; 257/59
(58) Field of Search ............. 349/43; 257/59, 257/72

(56) References Cited

U.S. PATENT DOCUMENTS

| | | | | |
|---|---|---|---|---|
| 5,187,551 A | * | 2/1993 | Shoji et al. ................ | 257/347 |
| 5,416,340 A | * | 5/1995 | Yoshida et al. ............ | 257/59 |
| 6,016,174 A | * | 1/2000 | Endo et al. ................ | 349/43 |
| 6,133,968 A | * | 10/2000 | Asada ....................... | 349/43 |
| 6,278,504 B1 | * | 8/2001 | Sung ......................... | 349/46 |
| 6,476,418 B1 | * | 11/2002 | Shiga et al. ............... | 257/72 |

FOREIGN PATENT DOCUMENTS

| JP | 1-100518 | 4/1989 | |
|---|---|---|---|
| JP | 4-88641 | 3/1992 | |
| JP | 7-122754 | 5/1995 | |
| JP | 7-159786 | 6/1995 | |
| JP | 7-306417 | * 11/1995 | ......... G02F/1/1343 |
| JP | 8-327978 | 12/1996 | |
| JP | 9-33946 | 2/1997 | |
| JP | 9-033946 | * 2/1997 | ........... G02F/1/136 |
| JP | 9-101538 | 4/1997 | |
| JP | 9-105908 | 4/1997 | |
| JP | 10-10494 | 1/1998 | |
| JP | 10-20294 | 1/1998 | |
| JP | 11-84428 | 3/1999 | |
| JP | 11-218755 | 8/1999 | |
| JP | 11-295764 | 10/1999 | |
| JP | 11-305266 | 11/1999 | |
| JP | 2000-19543 | 1/2000 | |
| JP | 2000-39625 | 2/2000 | |

* cited by examiner

*Primary Examiner*—Tarifur R. Chowdhury
*Assistant Examiner*—Prasad Akkapeddi
(74) *Attorney, Agent, or Firm*—Choate, Hall & Stewart, LLP

(57) ABSTRACT

The present invention provides a liquid crystal display apparatus of a lateral direction electric field drive type comprising an array substrate including a plurality of TFTs each having a gate electrode, a gate insulation film, a semiconductor layer, and a source electrode/drain electrode formed on a transparent substrate and an opposing substrate arrange so as to oppose to the array substrate, wherein the semiconductor layer has a width in the gate length direction identical to the gate length.

8 Claims, 22 Drawing Sheets he exposure.

LIQUID CRYSTAL DISPLAY APPARATUS OF A LATERAL DIRECTION ELECTRIC FIELD DRIVE TYPE

BACKGROUND OF THE INVENTION

1. Field of the Invention

The present invention relates to a liquid crystal display apparatus of the lateral direction electric field drive type or the twisted nematic type and in particular to a liquid crystal display apparatus having a high display quality and little residual image.

2. Description of the Related Art

Recently, a study has been made on a liquid display apparatus of IPS (in plane switching) type (or lateral direction electric field drive type) in which the molecule axis direction of oriented molecules is rotated in the horizontal direction with respect to a substrate.

The liquid crystal display apparatus of the IPS type is characterized in that it is possible to obtain a wide FOV (field of view) angle as compared to a liquid crystal display apparatus of TN (twist nematic) type.

FIG. 24 is a cross sectional view of a TFT element of a liquid crystal display (LCD) apparatus using the conventional IPS method. In FIG. 24, the TFT is formed by a gate electrode 101, a gate insulation film 102, a semiconductor layer 103, a source electrode 104 a drain electrode 105, and an insulation film 106 layered on a transparent substrate. The semiconductor layer 103 is formed in such a way that semiconductor layer 103 protrude from the gate electrode 101.

Light incident from the back light into the back of an active matrix is shaded by the gate electrode. However, as has been described above, when the semiconductor layer protrudes from the gate electrode, the light of the back light directly collides into this protrusion of the semiconductor layer and a plenty of leak current is generated, causing a residual image.

Moreover, the liquid crystal display apparatus of the IPS type in which the liquid crystal has a low transmittance has a problem that an increase of the back light quantity causes an increase of the leak current by the outward protrusion, thereby deteriorating the residual image level.

A method to improve the residual image problem by controlling characteristics of the liquid crystal material, the orientation film, and the insulation film has been suggested, for example, in Japanese Patent Publication 7-159786. In this known technique, the residual image is reduced by lowering the resistance value of the liquid crystal. However, in this method, the number of movable ions in the liquid crystal is increased and the liquid crystal has a low resistance. Accordingly, as shown in FIG. 25, more movable ions are adsorbed into an indentation of the back channels compared in the prior art. As a result, the light leak current is increased, disabling improvement of the residual image level.

On the contrary, when the semiconductor layer is smaller than the gate electrode, the overlap of the gate electrode and the drain electrode/source electrode increases the parasitic capacity in this portion. This causes a phenomenon called field through which causes irregularities in the target potential to be maintained in the pixel electrode. This appears as flickers on the screen.

Moreover, the overlap of the drain electrode/source electrode and the semiconductor layer requires a predetermined area to assure ON current.

Moreover, the overlap of the source electrode and the semiconductor layer requires a predetermined area for a necessary ohmic contact.

Considering the aforementioned, in order to reduce the residual image, it is considered preferable to make the width of the semiconductor layer in the gate length direction identical to the gate length.

Moreover, as a method for forming the semiconductor layer properly in relation to the gate electrode, there is a method to perform a resist exposure from the back of the gate electrode. This methods includes a step of patterning of the gate electrode, a step of forming a semiconductor layer thereon, a step of forming a resist thereon, and a step of exposure from the back of the gate electrode. In this case, the resist is exposed along the gate electrode pattern. Accordingly, the semiconductor layer is formed properly in relation to the gate electrode.

Considering the aforementioned, in order to improve the residual image level, it is considered preferable to make the width of the semiconductor layer in the channel length direction identical to the gate width in the channel length direction.

Moreover, as a method for forming the semiconductor layer properly in relation to the gate electrode, there is a method to perform, after formation of the gate electrode, an exposure from the back of an active matrix substrate for forming the semiconductor substrate (back surface exposure method). This methods includes a step of patterning of the gate electrode, a step of forming a semiconductor layer thereon, a step of forming a resist thereon, and a step of exposure from the back of the active matrix substrate. In this case, the resist excluding the portion on the gate electrode pattern is exposed. Accordingly, the semiconductor layer is formed properly in relation to the gate electrode.

However, when forming the semiconductor layer properly in relation to the gate electrode by the resist exposure from the back of the gate electrode, the used for exposure from the back is absorbed by an amorphous silicon layer, disabling the exposure.

Moreover, this method has a problem that the back surface of the active matrix substrate is easily scratched and cannot be used in practice.

SUMMARY OF THE INVENTION

It is therefore an object of the present invention to provide a liquid crystal display (LCD) apparatus of the IPS type having a high display quality and little residual image in which a semiconductor layer has a width of the gate length direction identical to a gate length and a liquid crystal of a low resistance is used without performing a special step as compared to the conventional example and without increasing a leak current in the off state of a thin film transistor.

Another object of the present invention is to provide production method of a liquid crystal display apparatus in which a semiconductor layer can easily be formed properly in relation to the gate electrode.

Another object of the present invention to provide a liquid crystal display (LCD) apparatus having a high display quality and little residual image without performing a special step as compared to the conventional example and without increasing a leak current in the off state of a thin film transistor.

Another object of the present invention is to provide production method of a liquid crystal display apparatus in which a semiconductor layer can easily be formed properly in relation to the gate electrode.

The present invention provides a liquid crystal display apparatus of a lateral direction electric field drive type comprising an array substrate including a plurality of TFTs each having a gate electrode, a gate insulation film, a semiconductor layer, and a source electrode/drain electrode formed on a transparent substrate and an opposing substrate arrange so as to oppose to the array substrate, wherein the semiconductor layer has a width in the gate length direction identical to the gate length.

The present invention also provides a liquid crystal display apparatus production method comprising a photoresist step using a single mask for forming a semiconductor layer and a gate electrode.

Another, the present invention provides a liquid crystal display apparatus of the lateral direction electric field drive type comprising an array substrate including a plurality of TFTs each having a gate electrode, a gate insulation film, a semiconductor layer, and a source electrode/drain electrode formed on a transparent substrate and an opposing substrate arrange so as to oppose to the array substrate, wherein the semiconductor layer has a width in the gate length direction identical to the gate electrode width in the channel length direction.

Another aspect of the present invention provides a liquid crystal display apparatus of the lateral direction electric field drive type comprising an array substrate including a plurality of TFTs each having a gate electrode, a gate insulation film, a semiconductor layer, and a source electrode/drain electrode formed on a transparent substrate and an opposing substrate arrange so as to oppose to the array substrate, wherein the semiconductor layer has a width in the gate length direction smaller than the gate electrode width in the channel length direction by 0 to 5 micrometers, considering a positioning margin during production.

Still another aspect of the present invention provides a liquid crystal display apparatus, wherein the liquid crystal has a specific resistance not greater than $5 \times 10^{12}$ [Ωcm].

Yet another aspect of the present invention provides a liquid crystal display apparatus, wherein the semiconductor layer has a portion of the side along the channel length direction removed.

Further another aspect of the present invention provides a liquid crystal display apparatus, wherein the semiconductor layer has a portion of the side along a direction vertical to the channel length direction protruding outside the gate electrode.

Still yet another aspect of the present invention provides a liquid crystal display apparatus, wherein the semiconductor layer has a portion of the side along the channel length direction removed and a portion of the side along a direction vertical to the channel length direction protruding outside the gate electrode.

Yet still another aspect of the present invention provides a liquid crystal display apparatus of the twisted nematic type comprising an array substrate including a plurality of TFTs each having a gate electrode, a gate insulation film, a semiconductor layer, and a source electrode/drain electrode formed on a transparent substrate and an opposing substrate arrange so as to oppose to the array substrate, wherein the semiconductor layer has a side along a direction vertical to the channel length direction partially protruding outside the gate electrode.

Yet still another aspect of the present invention provides a liquid crystal display apparatus of the twisted nematic type comprising an array substrate including a plurality of TFTs each having a gate electrode, a gate insulation film, a semiconductor layer, and a source electrode/drain electrode formed on a transparent substrate and an opposing, wherein the semiconductor layer has a side along the channel length direction partially removed and a side along a direction vertical to the channel length direction protruding outside the gate electrode.

Still another aspect of the present invention provides a liquid crystal display apparatus production method for producing the aforementioned liquid crystal display apparatus, the method comprising a photoresist step using a single mask for forming the semiconductor layer and the gate electrode.

DESCRIPTION OF THE PREFERRED EMBODIMENTS

Description will now be directed to preferred embodiments of the present invention with reference to the attached drawings.

Figure 1:
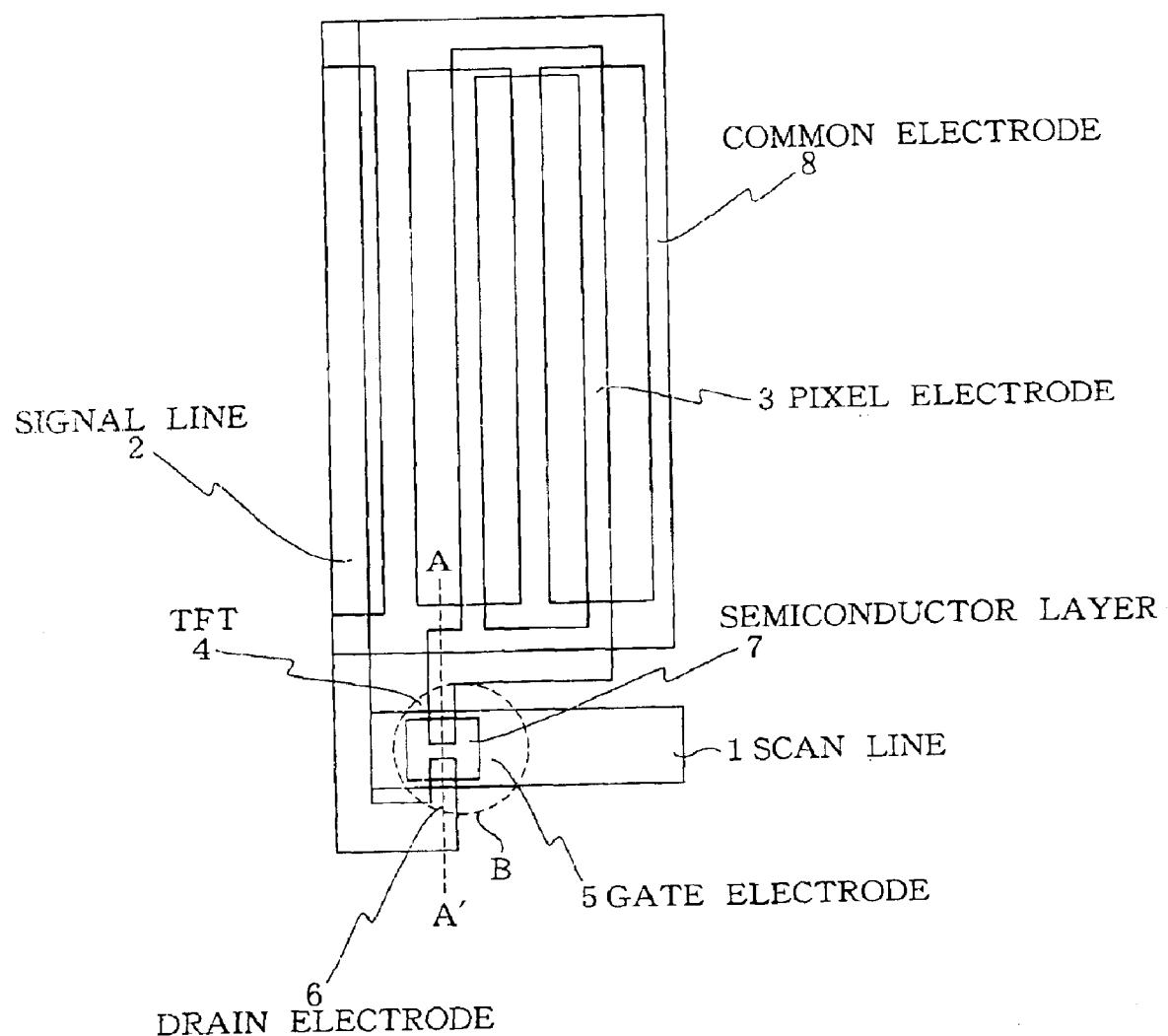
FIG. 1 is an enlarged plan view of a unit pixel of a liquid crystal display apparatus according to an embodiment of the present invention.

FIG. 1 is an enlarged plan view of a unit pixel of a liquid crystal display apparatus according to a first embodiment of the present invention. In a region defined by a scan line 1 and a signal line 2 arranged in a matrix shape, a TFT (thin film transistor) 4 and a pixel electrode 3 connected to the TFR are formed. The TFT 4 has a gate electrode 5 on which a semiconductor layer 7 is formed for forming a TFT via an insulation film (not depicted). Furthermore, on these, a pixel electrode (source electrode) 3 and a drain electrode 6 are formed so as to sandwich the semiconductor layer 7. Moreover, the gate electrode 5 is connected to the scan line 1 while the drain electrode 6 is connected to a signal line 2. A reference symbol 8 denotes a common electrode positioned on the same layer as the gate layer.

Figure 2:
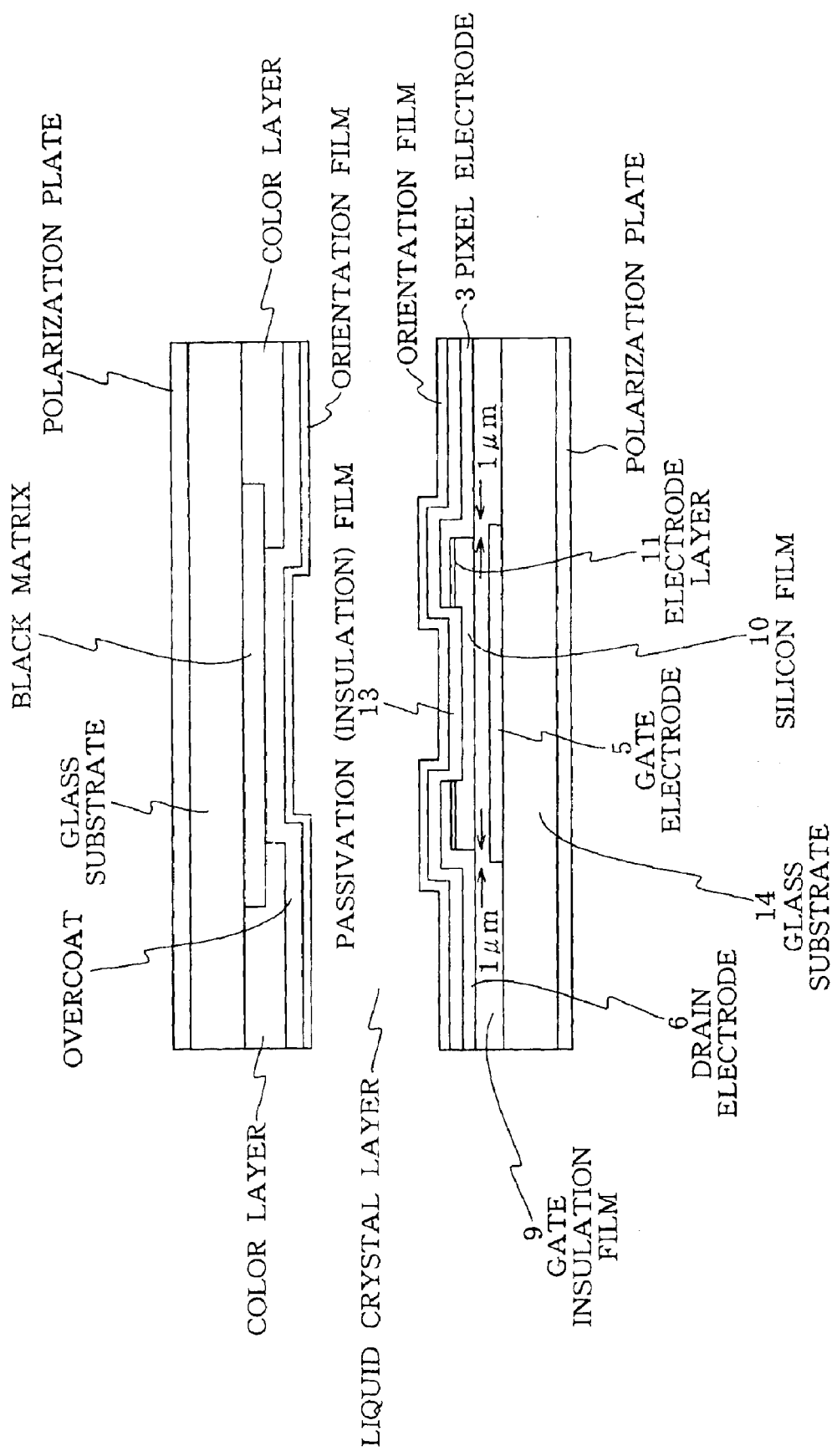
FIG. 2 is a cross sectional view about the line A–A' in FIG. 1.

FIG. 2 is a cross sectional view about a line A–A' in FIG. 1. It should be noted that like components are denoted by like reference symbols. The gate electrode 5 is formed on a part of a glass substrate 14. On the same layer and in the same production step, the common electrode 8 is formed in the shape of a comb. The insulation film 9 is formed to cover the gate electrode d5 and the common electrode 8 completely.

On the gate electrode 5, an island is formed by layers of the a silicon film 10 to serve as a semiconductor layer of the TFT 4 via the gate insulation film 9, and an electrode layer 11 made from a silicon film doped by impurities such as phosphorous to compensate for a contact. Considering the positioning margin at production, the island is formed with a width in the gate length direction smaller than the gate length by 0 to 2 micrometers.

Furthermore, on a part of this island, the pixel electrode 3 and the drain electrode 6 are formed. After this, a part of the electrode layer 11 made from the silicon film doped by impurities is removed, to form a channel portion of the TFT 4.

Moreover, in a pixel portion contributing to display, the pixel electrode 3 is formed in parallel to the common electrode 8 arranged in a comb shape so as to form alternating comb teeth. Here, an auxiliary capacitor is formed between the common electrode 8 and the pixel electrode 3. The pixel electrode 3 and the common electrode 8 face to each other via the gate insulation film 9. Voltage is applied in the lateral direction between the opposing pixel electrode 3 and the common electrode 8 so as to drive the liquid crystal.

Furthermore, a passivation film 13 is formed to cover the entire surface of the TFT 4 and the pixel electrode 3. Extensions of the gate electrode 5 and the drain electrode 6 becomes the scan line 1 and the signal line 2 shown in FIG. 1, respectively.

The gate electrode 5, the pixel electrode 3, and the drawing electrode 6 are formed by sputtering or deposition of a metal film selected from a group consisting of Al, Cr, Ta, Ti, Mo, W, Nb, and Pt, or an alloy film using these metals, or a layered film of these.

The gate insulation film 9 and the passivation film 13 are formed by an insulation film such as a silicone nitride film or a silicon oxide film formed, for example, by plasma CVD or sputtering. The gate insulation film 9 may also be formed by oxidizing a portion of surface of the gate electrode 5 and the scan line 1. Moreover, it may be a layered film of the oxide film and the silicon nitride film or the silicone oxide film.

The silicon film 10 to serve as a channel semiconductor layer and an electrode layer 11 made from a silicon film doped by impurities are formed, for example, by an amorphous silicon film or a polycrystal silicon film formed by the CVD method.

FIG. 3(a) to FIG. 3(e) show production steps for producing the liquid crystal display apparatus shown in FIG. 1 and FIG. 2. The right half of FIG. 3 shows plan views and the left half of FIG. 3 shows cross sectional views about center line in the direction of the shorter side.

Firstly, in FIG. 3(a), a gate electrode is formed on a glass substrate. Next, in FIG. 3(b), a gate insulation film, an amorphous silicon layer, and an n-type amorphous silicon layer are layered. Next, in FIG. 3(c), the n-type amorphous silicon layer and the amorphous silicon layer are selectively etched at once so as to obtain an island shape. Here, the island shape is formed so that the edge of the amorphous silicon layer is matched with the gate electrode. Next, in FIG. 3(d), a source/drain metal is formed and a channel etching is performed. Lastly, in FIG. 3(e), a passivation film is formed.

Next, explanation will be given on a specific example of the island configuration when the configuration of the present invention is applied to a liquid crystal display apparatus having such a pixel configuration.

Figure 4:
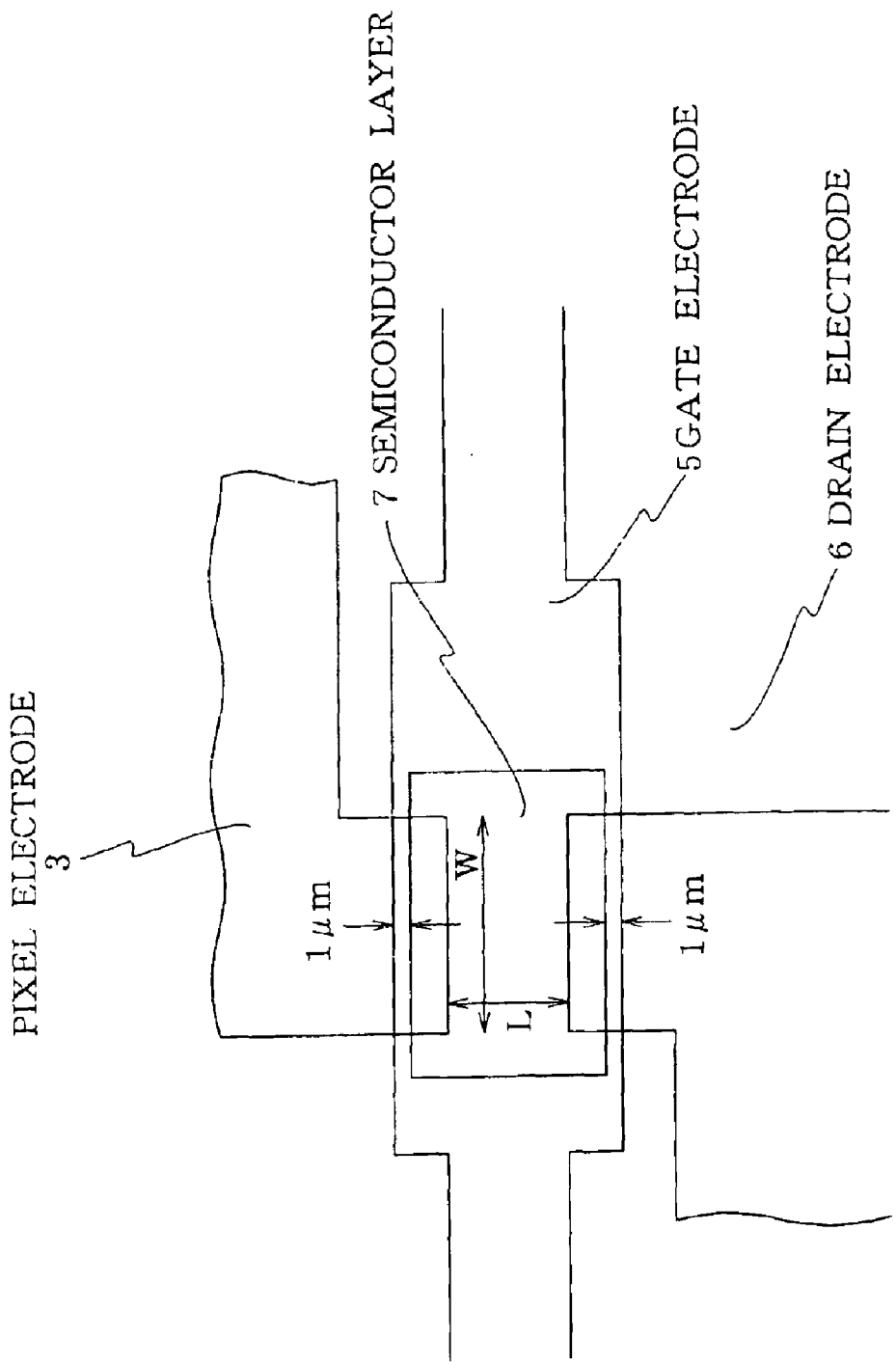
FIG. 4 is an enlarged view of a portion defined by a dotted line in FIG. 1.

FIG. 4 is an enlarged view of the portion defined by a dotted line B in FIG. 1. It should be noted that like components are denoted by like reference symbols.

It is preferable that the contour line of the island in the longitudinal direction be on-lined with the contour line of the gate electrode in the longitudinal direction, but considering a positioning margin in the exposure process forming an island, it is recessed from the contour line in the longitudinal direction of the gate electrode by 0 to 2 micrometers. The ratio W/L of the channel length and the channel width is, for example, $20/8 \geq W/L \geq 20/10$.

Figure 5:
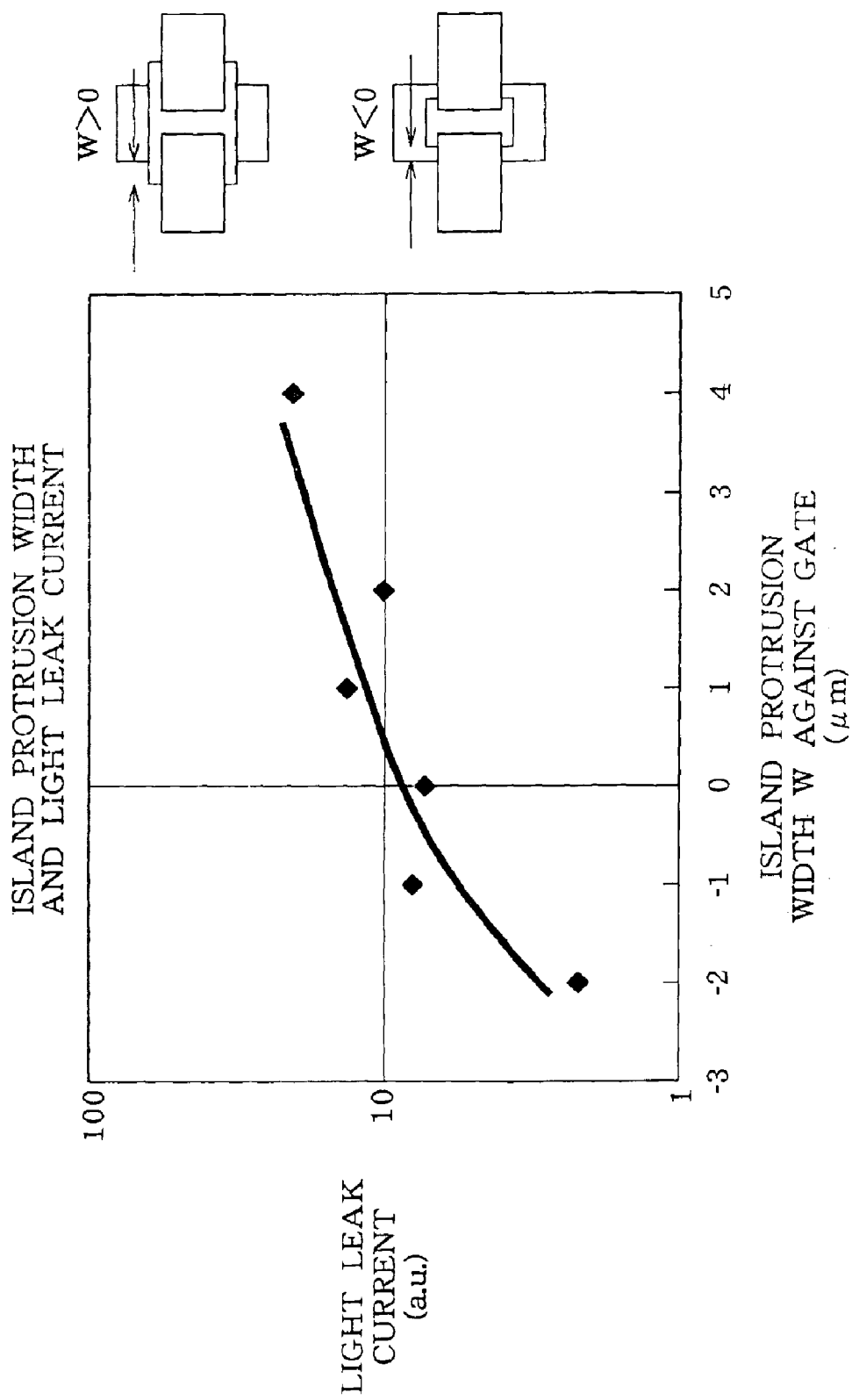
FIG. 5 graphically shows the relationship between the island protrusion width and the light leak current.

FIG. 5 shows the relationship between the protrusion width of one side of the island protruding from the gate electrode and the light leak current. This figure shows that as the protrusion of the island from the gate electrode increases, the light leak current is increased and as the protrusion width is reduced, the light leak can be suppressed.

Figure 6:
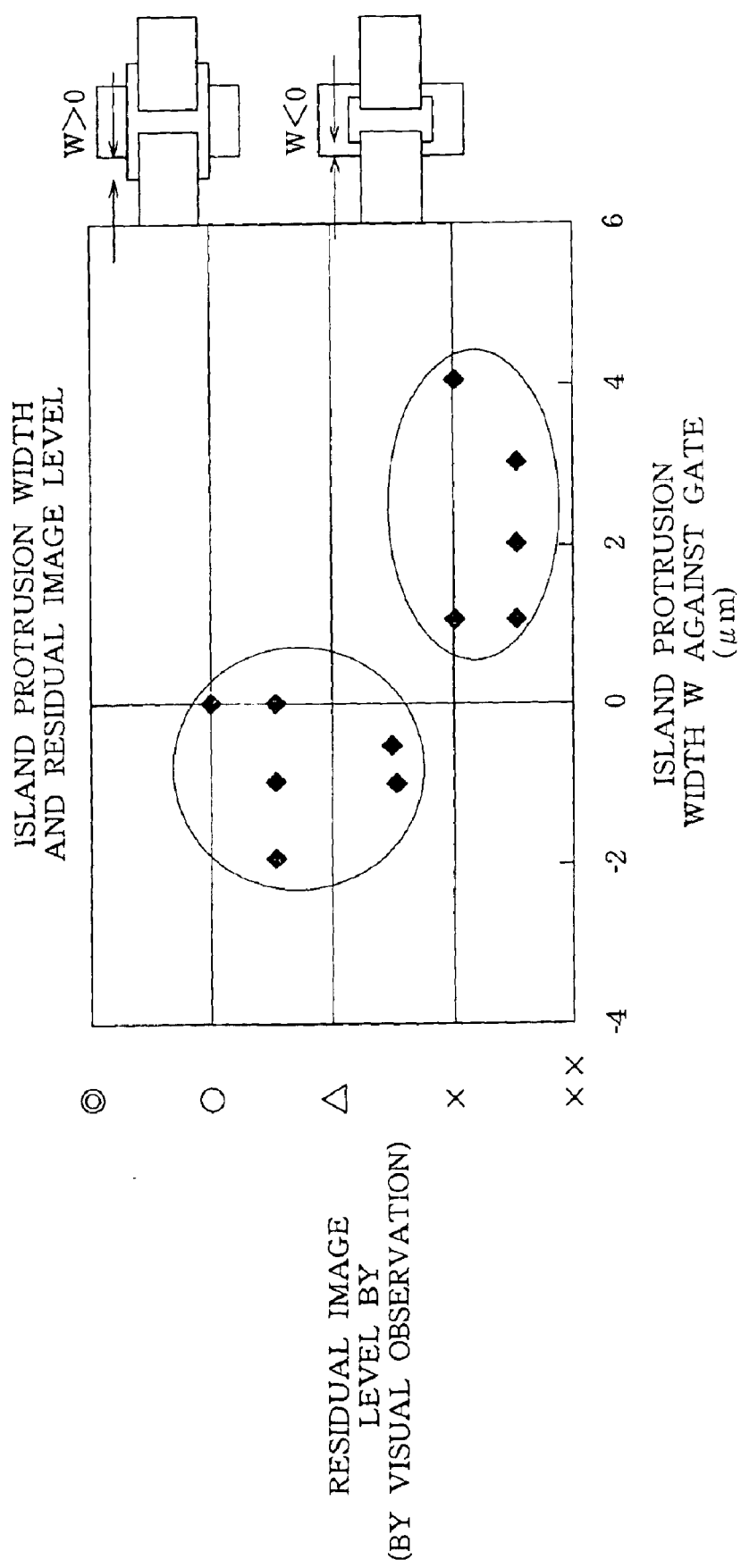
FIG. 6 shows the relationship between the island protrusion width and the residual image level based on experiment data.

FIG. 6 shows the relationship between the island protrusion width and the residual image level based on experiment data. The residual image level is evaluated in five grades: ⊙ represents a level that cannot be observed from the front at all; ○ represents a level that cannot be observed from the from the front but can be slightly viewed from a perspective viewpoint; Δ represents a level that can be slightly viewed from the front; X represents a level that can be viewed from the front; and XX represents a level that can be clearly viewed from the front. If the levels up to Δ are considered to be allowable, it is found that the protrusion width is preferably not greater than 2 micrometers.

Figure 7:
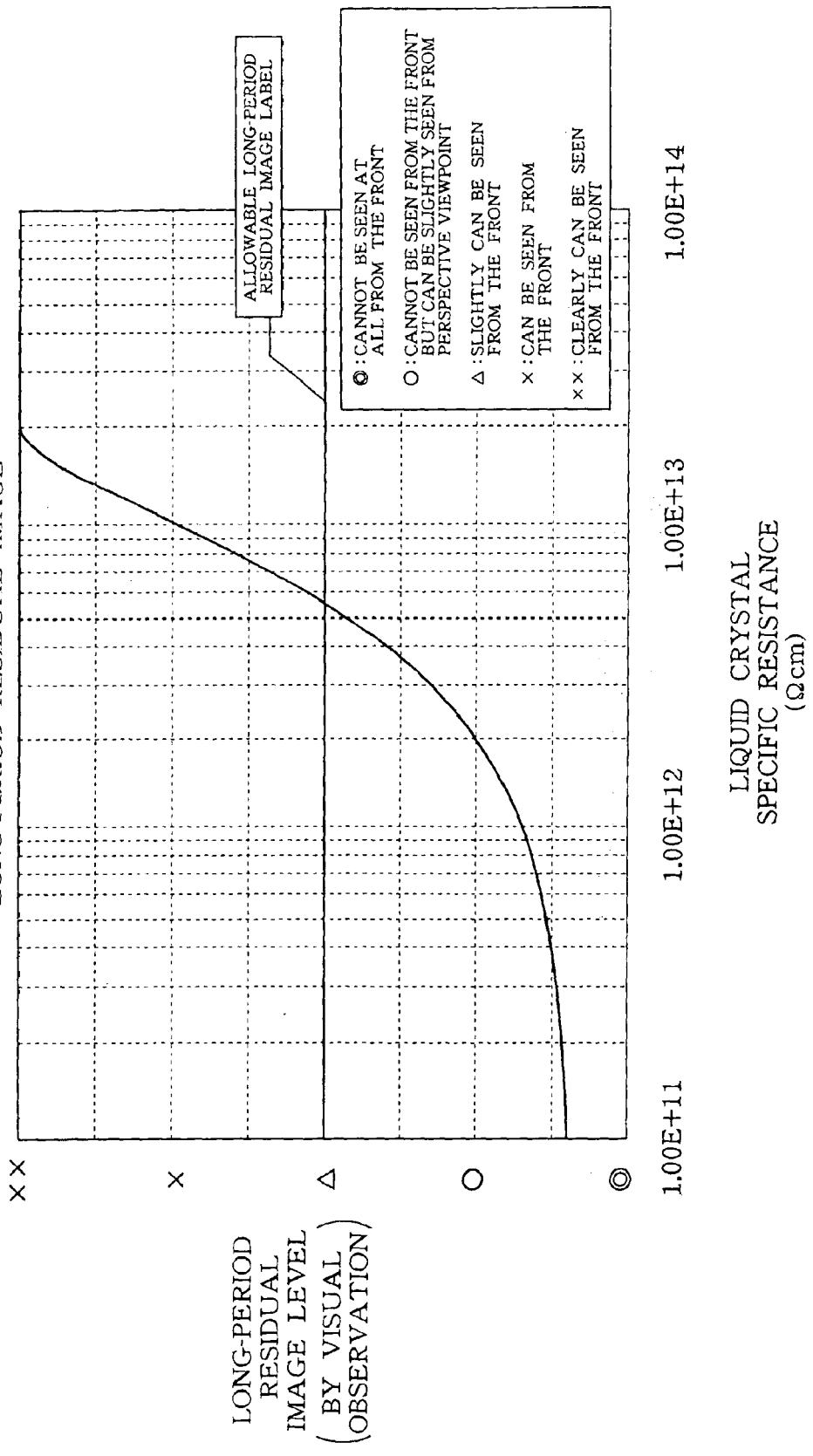
FIG. 7 graphically shows the relationship between the liquid crystal specific resistance and the long-period residual image.

Moreover, FIG. 7 shows the relationship between the liquid crystal specific resistance and the long-period residual image when the island protrusion width is not greater than 2 micrometers. That is, FIG. 7 graphically shows the residual image change while the liquid crystal resistance is changed.

In this graph, the horizontal axis represents the specific resistance of the liquid crystal and the vertical axis represents the long-period residual image level. This graph is based on an experiment performed as follows. A fixed pattern was displayed for 24 hours and then returned to a brightness of an intermediate level between white and black as an intermediate gradation when a visual observation was made to see how much the fixed pattern remained visible. If the levels up to Δ are considered to be allowable, the liquid crystal resistance is preferably not greater than $5 \times 10^{12}$ [Ωcm].

Figure 8:
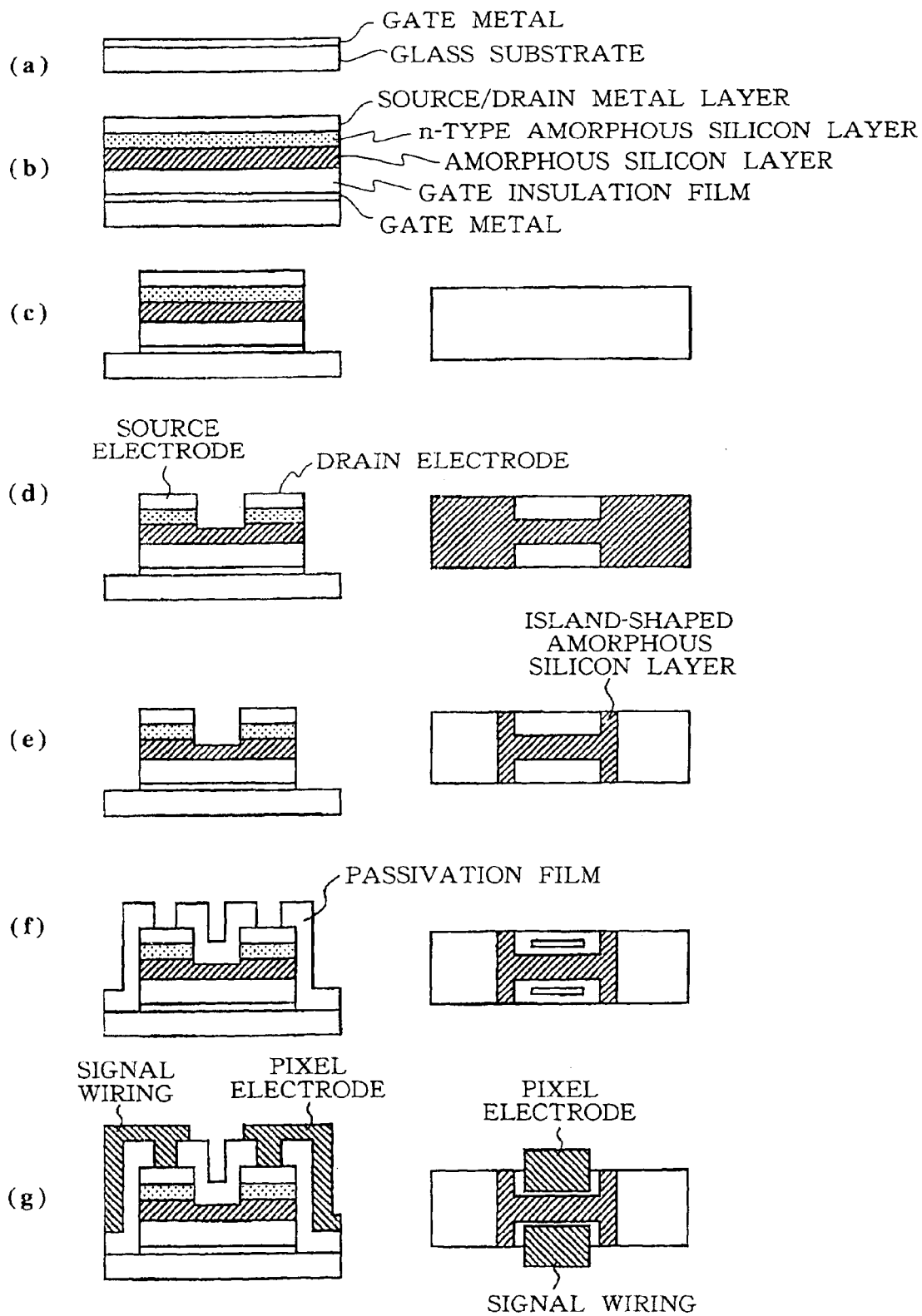
FIG. 8 shows production steps for explaining a production method in which a contour line of an island in the longitudinal direction is made on-lined with a contour line of a gate in the longitudinal direction.

Next, explanation will be given on a production method of a liquid crystal display apparatus which facilitates the contour line of the island in the longitudinal direction to be on-lined with the contour line of the gate in the longitudinal direction. FIG. 8 shows the production steps for it. The right half of the figure shows plan view and the left half of the figure shows cross sectional views about a center line in the shorter side direction.

Firstly, in FIG. 8(a), a gate metal is formed. In FIG. 8(b), a gate insulation film, an amorphous silicon layer, an n-type amorphous silicon layer, and a source drain metal layer are formed on the gate metal. Next, in FIG. 8(c), the gate metal, the gate insulation film, the amorphous silicon layer, the n-type amorphous silicon layer, and the source drain metal layer are selectively etched and patterned according to a pattern of the gate electrode as the scan line in one photoresist step.

Next, in FIG. 8(d), the source drain metal layer is patterned to form the source/drain electrode and with this pattern, a channel etching is performed. After this, in FIG. 8(e), the amorphous silicon layer is selectively etched for patterning an island-shaped amorphous silicon layer. Next, in FIG. 8(f), a passivation insulation film is formed and a source/drain portion for contact is removed. Lastly, in FIG. 8(g), a signal wiring and pixel electrode formation are performed.

Although this production method cannot reduce the number of production steps, in step FIG. 8(c), the amorphous silicon layer and the n-type amorphous silicon layer are pattered with the gate electrode pattern, which enables to form the contour line of the island in the longitudinal direction on-line with the contour line of the gate in the longitudinal direction. That is, it is possible to make the semiconductor layer properly in relation to the gate electrode. Moreover, according to the production method, it is possible to eliminate the problem that a resist exposure from the back of the gate electrode for forming the semiconductor layer causes light absorption in the amorphous silicon layer.

Figure 9:
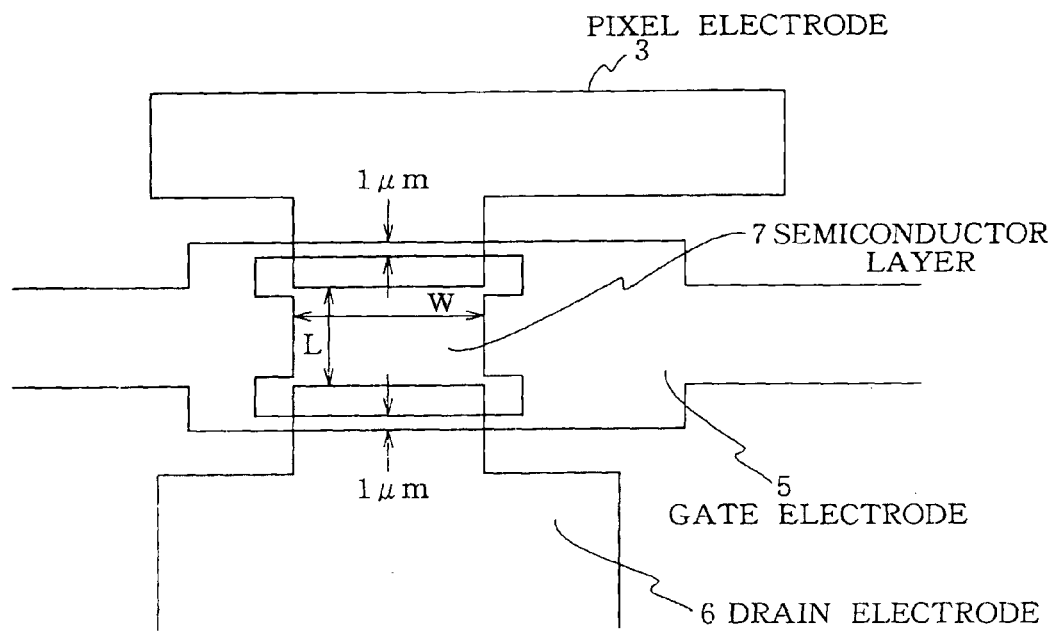
FIG. 9 shows another example of the island configuration.
Figure 10:
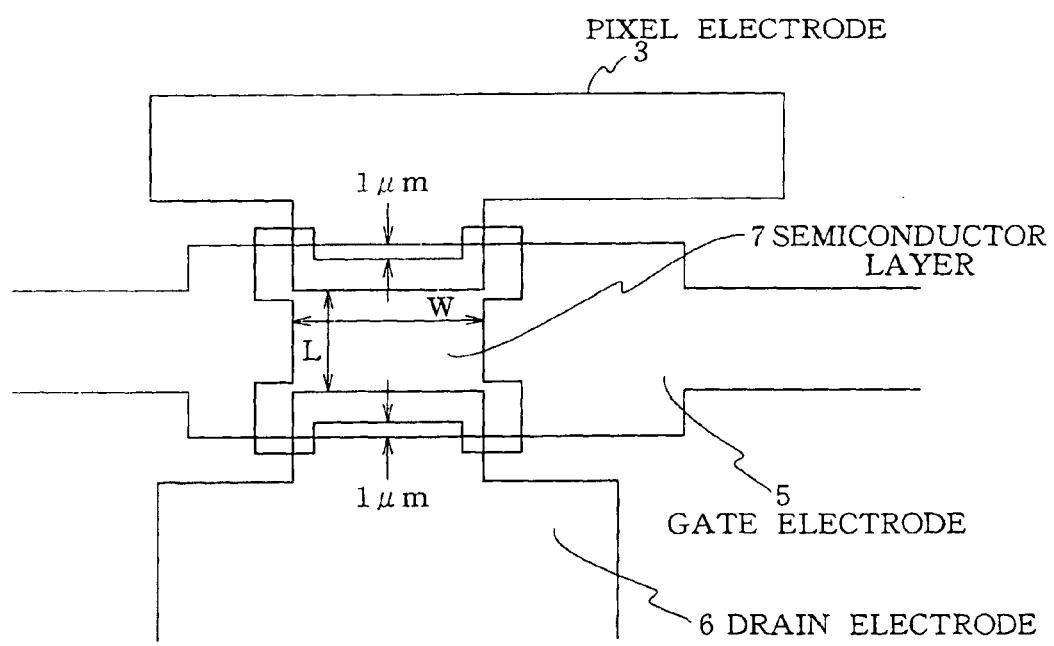
FIG. 10 shows still another example of the island configuration.
Figure 11:
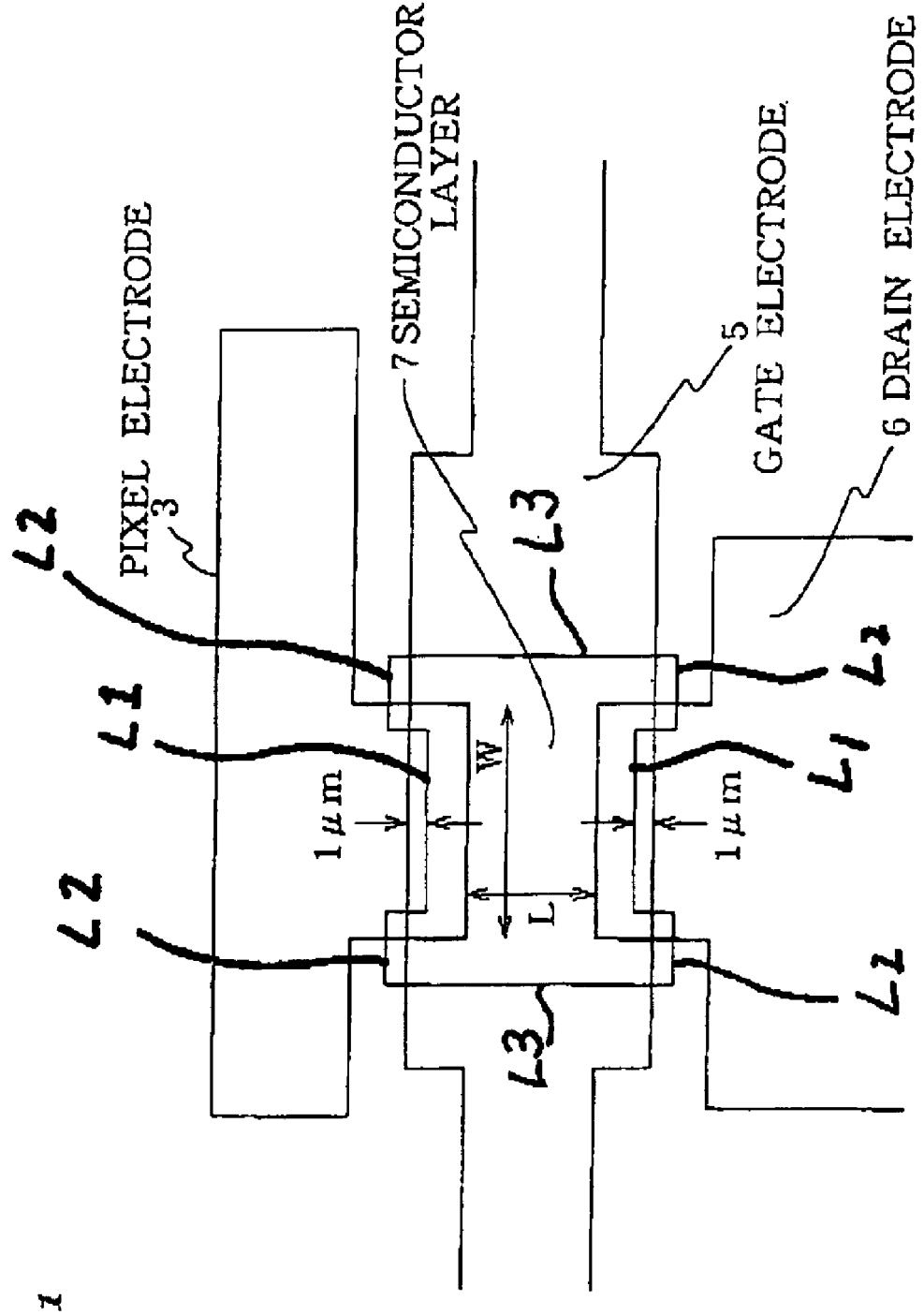
FIG. 11 shows yet another example of the island configuration.

Next, second embodiments of the island configurations are shown in FIG. 9, FIG. 10, and FIG. 11. These embodiments can further reduce the leak current as compared to the configuration shown in FIG. 4. It should be noted that the configurations of FIG. 9 to FIG. 11 are only examples and the present invention is not to be limited to these configurations.

FIG. 9 shows a configuration of the semiconductor layer 7 in which a center portion of the side along the gate length direction is removed. FIG. 10 shows a configuration of the semiconductor layer 7 in which a portion of the side along the gate length direction is removed and a portion along the gate width direction is enlarged outside the gate electrode. FIG. 11 shows a configuration of the semiconductor layer 7 in which a portion of the side along the gate width direction is enlarged outside the gate electrode.

Explanation will be given below on the reason why the leak current can be reduced by these configurations of the semiconductor layer shown in FIG. 9 to FIG. 11.

Figure 12:
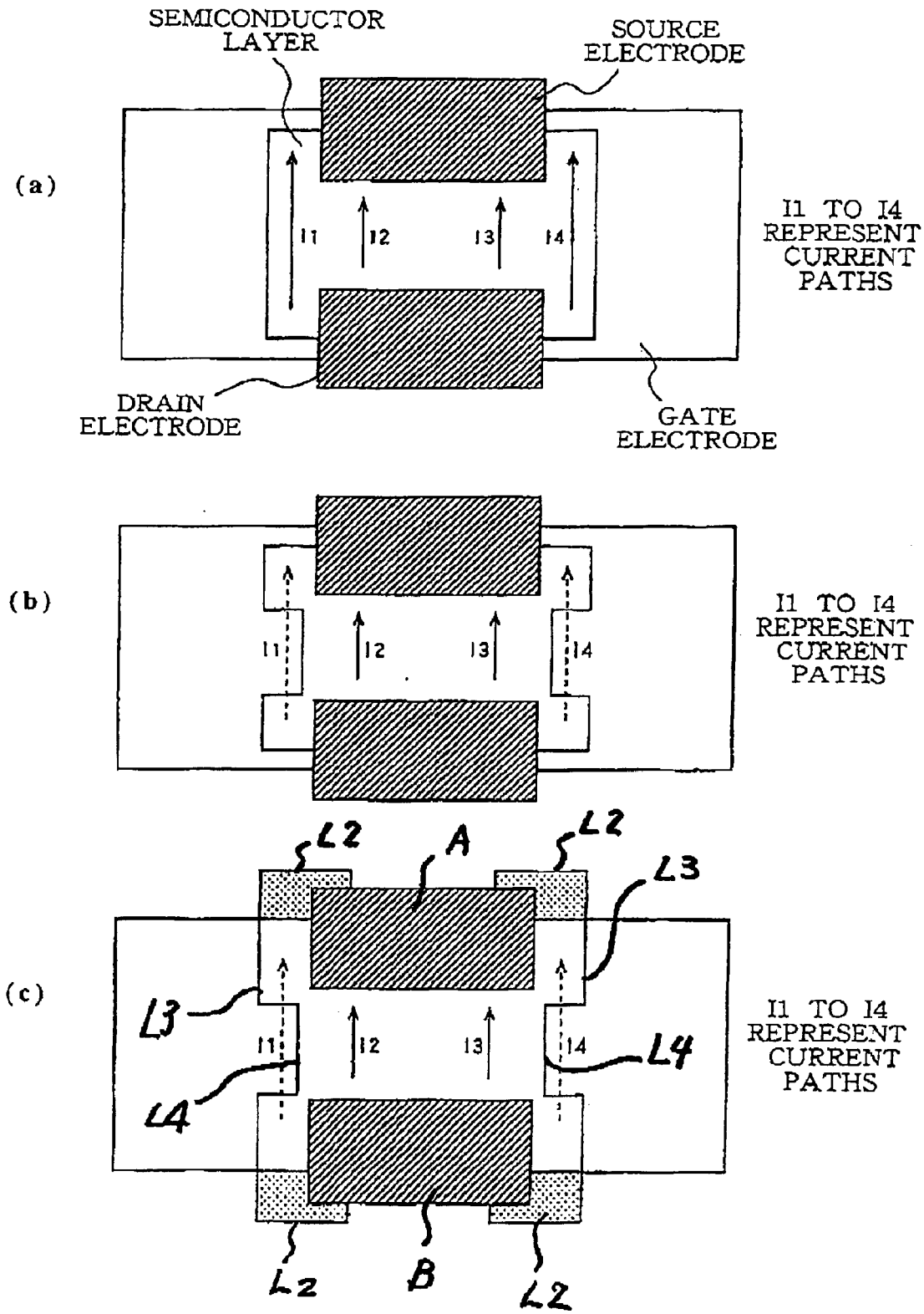
FIG. 12 explains the reason which a part of the semiconductor layer is removed or enlarged.

As shown in FIG. 12(a), as the experiment fact, the leak current when the gate is off is I2=I3<<I1=I4 considering respective paths. The I1 and I4 are greater because the pixel electrode 3 and the drain electrode 6 are not shaded and a carrier is easily generated on this path. On the other hand, I1 and I4 do not contribute to the ON current.

Accordingly, as shown in FIG. 12(b), when the semiconductor layer portion on I1 and I4 is removed, the OFF current can be reduced as compared to FIG. 12(a) while maintaining the ON current.

Moreover, as shown in FIG. 12(c), when a portion of the semiconductor is enlarged outside the gate electrode, it is possible to increase the ON current by utilizing the photo carrier generated by the light applied to the enlarged portion.

In the aforementioned liquid crystal display apparatus, the channel portion of the thin film transistor (TFT) is shaded by the gate electrode, thereby suppressing generation of the photo carrier caused by light incident into the semiconductor layer. Accordingly, it is possible to increase the ON/OFF ratio of the switching characteristic. Thus, an appropriate voltage is applied to the white display portion and black display portion, thereby suppressing a long-period residual image and obtaining a high display quality.

Conventionally, when a fixed display pattern of a white and black checker black is applied for 24 hours (residual image test) and then an intermediate gradation is set on, a boundary between patterns remains clear with a clear contrast of the fixed display pattern. However, when the aforementioned configuration of the present invention is applied, switching to the intermediate gradation after the residual image test results in an unclear boundary of the fixed display pattern and no contrast difference.

It should be noted that the present invention makes the width of the semiconductor layer in the gate length direction identical to the gate length in order to reduce the residual image generated by a leak current. In the aforementioned embodiments, explanation has been given on the semiconductor layer formed with a width smaller than the gate length by 0 to 2 micrometers, considering the positioning margin during production. When the semiconductor layer is recessed than the gate electrode, the gate electrode and the drain electrode/source electrode are overlaid to increase the parasitic capacity, causing flicker on the screen due to the feed-through phenomenon. This flicker should be reduced. To cope with this, considering the positioning margin during production, the semiconductor layer recess from the gate electrode is defined to be 2 micrometers at maximum.

As has been described above, in the liquid crystal display apparatus according to the present invention, the semiconductor layer is formed with a width in the gate longitudinal direction identical to the gate length and accordingly, the back light emitted from the back light and incident into the liquid crystal display apparatus does not come directly into the semiconductor layer. This enables to significantly reduce the leak current of the channel portion and drastically reduce the residual image.

Moreover, in the present invention, since the semiconductor layer is formed with a width in the gate length direction identical to the gate length, it is possible to obtain a comparatively small gate/source capacitance or gate/drain capacitance (parasitic capacitance), thereby reducing the field through voltage. This can prevent deterioration of the image quality of the liquid crystal display apparatus.

Moreover, in the liquid crystal display apparatus production method according to the present invention, the semiconductor layer and the gate electrode are formed in the photosresist step using the same mask. This enables to form the semiconductor layer properly in relation to the gate electrode. Thus, it is possible to solve the problem involved in the conventional production method that formation of the semiconductor layer properly in relation to the gate electrode using a resist exposure from the back of the gate electrode results in light absorption in the amorphous silicon layer, disabling the production.

Description will now be directed to a third embodiments of the present invention with reference to the attached drawings. Here, using some drawings of first embodiment and second embodiment for common configuration of this embodiment.

[Embodiment 3]

FIG. 1 is an enlarged plan view of a unit pixel of an active matrix substrate of a liquid crystal display apparatus of the IPS type according to a first embodiment of the present invention. In a region defined by a scan line 1 and a signal line 2 arranged in a matrix shape, a TFT (thin film transistor) 4 and a pixel electrode 3 connected to the TFT are formed. The TFT 4 has a gate electrode 5 on which a semiconductor layer 7 is formed for forming a TFT via an insulation film (not depicted). Furthermore, on these, a pixel electrode (source electrode) 3 and a drain electrode 6 are formed so as to sandwich the semiconductor layer 7. Moreover, the gate electrode 5 is connected to the scan line 1 while the drain electrode 6 is connected to a signal line 2. A reference symbol 8 denotes a common electrode positioned on the same layer as the gate layer.

FIG. 2 is a partial cross sectional view of a liquid crystal display apparatus including an opposing color filter about a line A–A' in FIG. 1. It should be noted that like components are denoted by like reference symbols. The gate electrode 5 is formed on a part of a glass substrate 14. On the same layer and in the same production step, the common electrode 8 is formed in the shape of a comb. The insulation film 9 is formed to cover the gate electrode d5 and the common electrode 8 completely.

On the gate electrode 5, an island is formed by layers of the a silicon film 10 to serve as a semiconductor layer of the TFT 4 via the gate insulation film 9, and an electrode layer 11 made from a silicon film doped by impurities such as phosphorous to assure ohmic contact with the source/drain electrode. Considering the positioning margin at production, the island is formed with a width in the channel length direction smaller than the gate electrode width in the channel length direction by 0 to 5 micrometers.

Furthermore, on a part of this island, the pixel electrode 3 and the drain electrode 6 are formed. After this, a part of the electrode layer 11 made from the silicon film doped by impurities is removed, to form a channel portion of the TFT 4.

Moreover, in a pixel portion contributing to display, the pixel electrode 3 is formed in parallel to the common electrode 8 arranged in a comb shape so as to form alternating comb teeth. Here, an auxiliary capacitor is formed between the common electrode 8 and the pixel electrode 3. The pixel electrode 3 and the common electrode 8 face to each other via the gate insulation film 9. Voltage is applied in the lateral direction between the opposing pixel electrode 3 and the common electrode 8 to generate a parallel component as an electric field which is parallel to the glass substrate 14 and drive the liquid crystal.

Furthermore, a passivation film 13 is formed to cover the entire surface of the TFT 4 and the pixel electrode 3. Extensions of the gate electrode 5 and the drain electrode 6 becomes the scan line 1 and the signal line 2 shown in FIG. 1, respectively.

The gate electrode 5, the pixel electrode 3, and the drawing electrode 6 are formed by sputtering or deposition of a metal film selected from a group consisting of Al, Cr, Ta, Ti, Mo, and W, or an alloy film using these metals, or a layered film of these.

The gate insulation film 9 and the passivation film 13 are formed by an insulation film such as a silicone nitride film or a silicon oxide film formed, for example, by plasma CVD or sputtering. The gate insulation film 9 may also be formed by oxidizing a portion of surface of the gate electrode 5 and the scan line 1. Moreover, it may be a layered film of the oxide film and the silicon nitride film or the silicone oxide film.

The silicon film 10 to serve as a semiconductor layer and an electrode layer 11 made from a silicon film doped by impurities are formed, for example, by an amorphous silicon film or a polycrystal silicon film formed by the CVD method.

Figure 3:
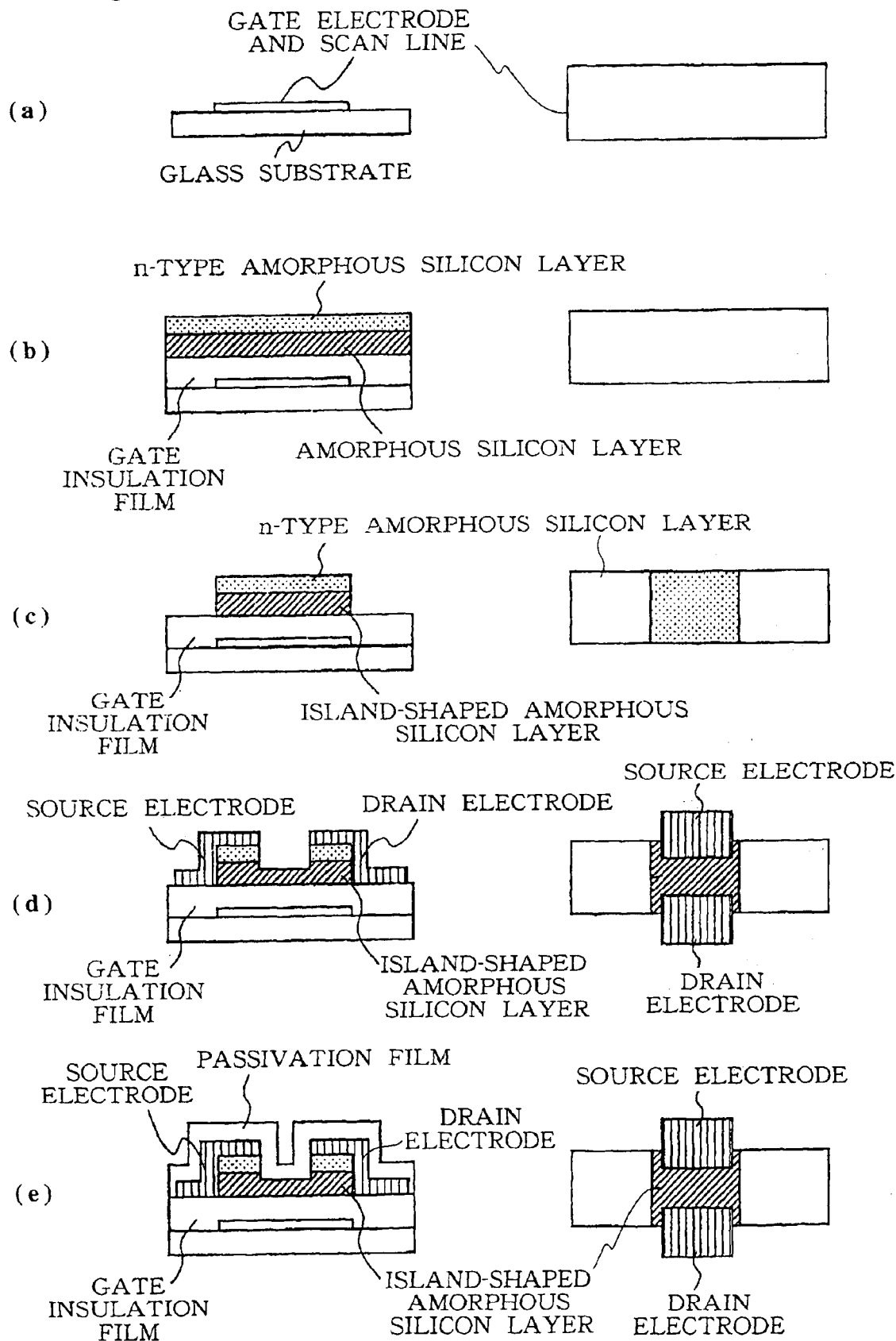
FIG. 3 shows a production steps for producing a liquid crystal display apparatus.

FIG. 3(*a*) to FIG. 3(*e*) show production steps for producing the liquid crystal display apparatus shown in FIG. 1 and FIG. 2. The right half of FIG. 3 shows plan views and the left half of FIG. 3 shows cross sectional views about center line in the direction of the shorter side.

Firstly, in FIG. 3(*a*), a gate electrode is formed on a glass substrate. Next, in FIG. 3(*b*), a gate insulation film, an amorphous silicon layer, and an n-type amorphous silicon layer are layered. Next, in FIG. 3(*c*), the n-type amorphous silicon layer and the amorphous silicon layer are selectively etched at once so as to obtain an island shape. Here, the island shape is formed so that the edge of the amorphous silicon layer is matched with the gate electrode. Next, in FIG. 3(*d*), a source/drain metal is formed and a channel etching is performed. Next, in FIG. 3(*e*), a passivation film is formed. Next, although not depicted, contact holes are formed in the passivation film and the gate insulation film. Next, a transparent conductive film is applied and patterned to form electrode terminals. Lastly, anneal is performed to complete an active matrix.

Next, explanation will be given on a specific example of the island configuration when the configuration of the present invention is applied to a liquid crystal display apparatus having such a pixel configuration.

Figure 13:
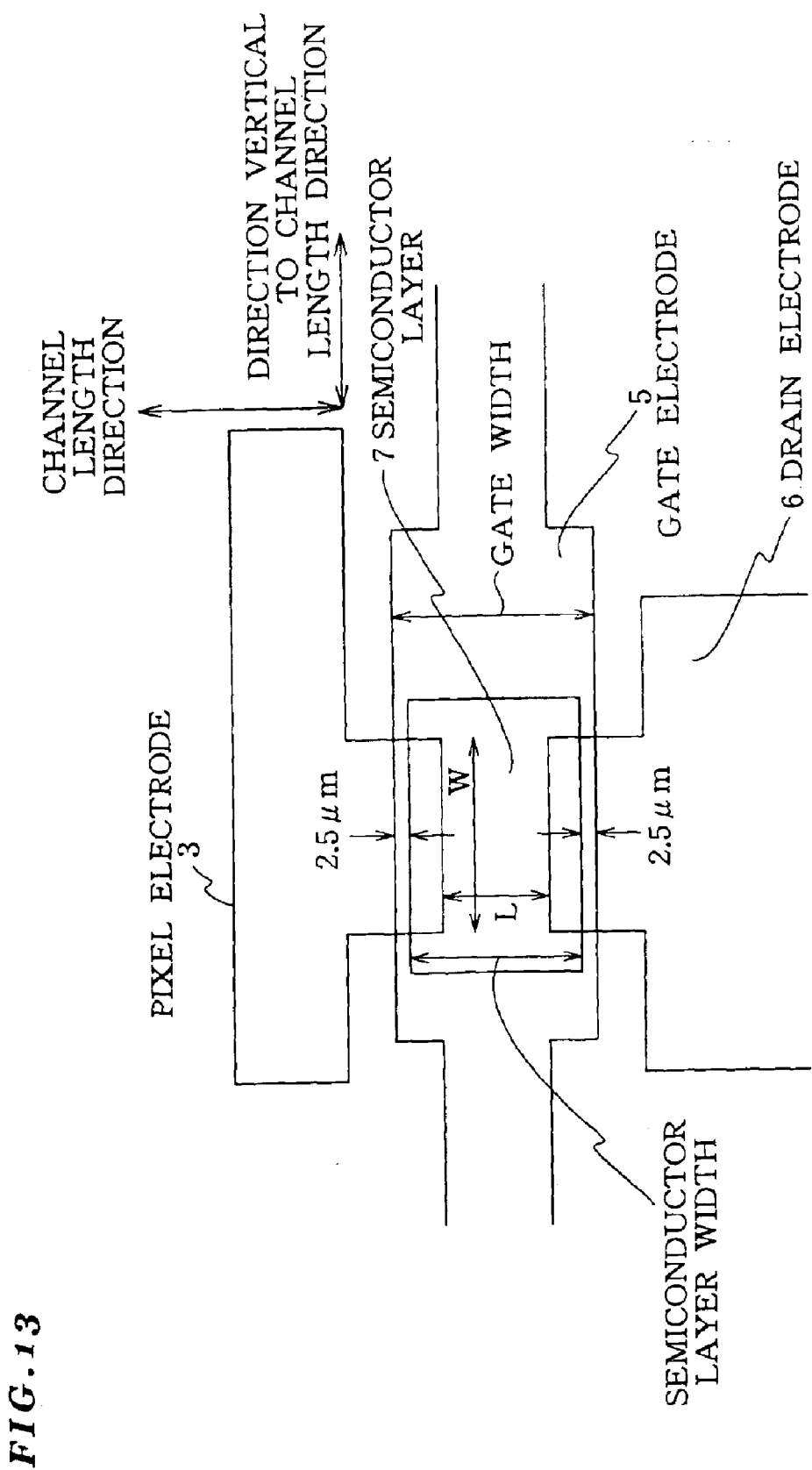
FIG. 13 is an enlarged view of a portion defined by a dotted line in FIG. 1.

FIG. 13 is an enlarged view of the portion defined by a dotted line B in FIG. 1. It should be noted that like components are denoted by like reference symbols.

It is preferable that the contour line of the island in the channel length direction be on-lined with the contour line of the gate electrode in the direction vertical to the channel length direction, but considering a positioning margin in the exposure process forming an island, it is recessed from the contour line of the gate electrode in the direction vertical to the channel direction by 0 to 5 micrometers. The ratio W/L of the channel length and the channel width is, for example, $20/8 \geq W1/L \geq 20/10$.

Figure 14:
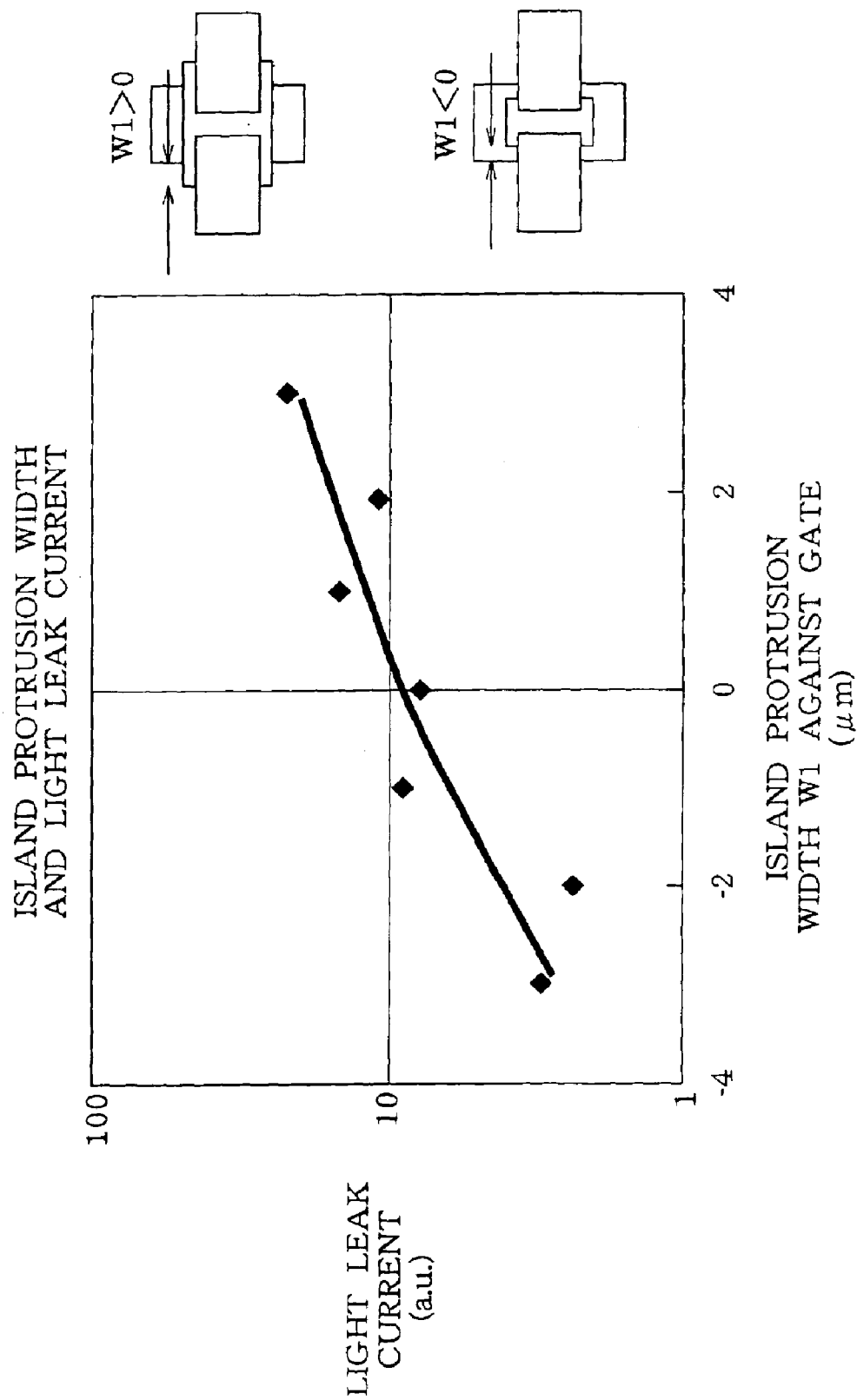
FIG. 14 graphically shows the relationship between the island protrusion width and the light leak current.

FIG. 14 shows the relationship between the protrusion width of one side of the island protruding from the gate electrode and the light leak current. This figure shows that as the protrusion of the island from the gate electrode increases, the light leak current is increased and as the protrusion width is reduced, the light leak can be suppressed.

Figure 15:
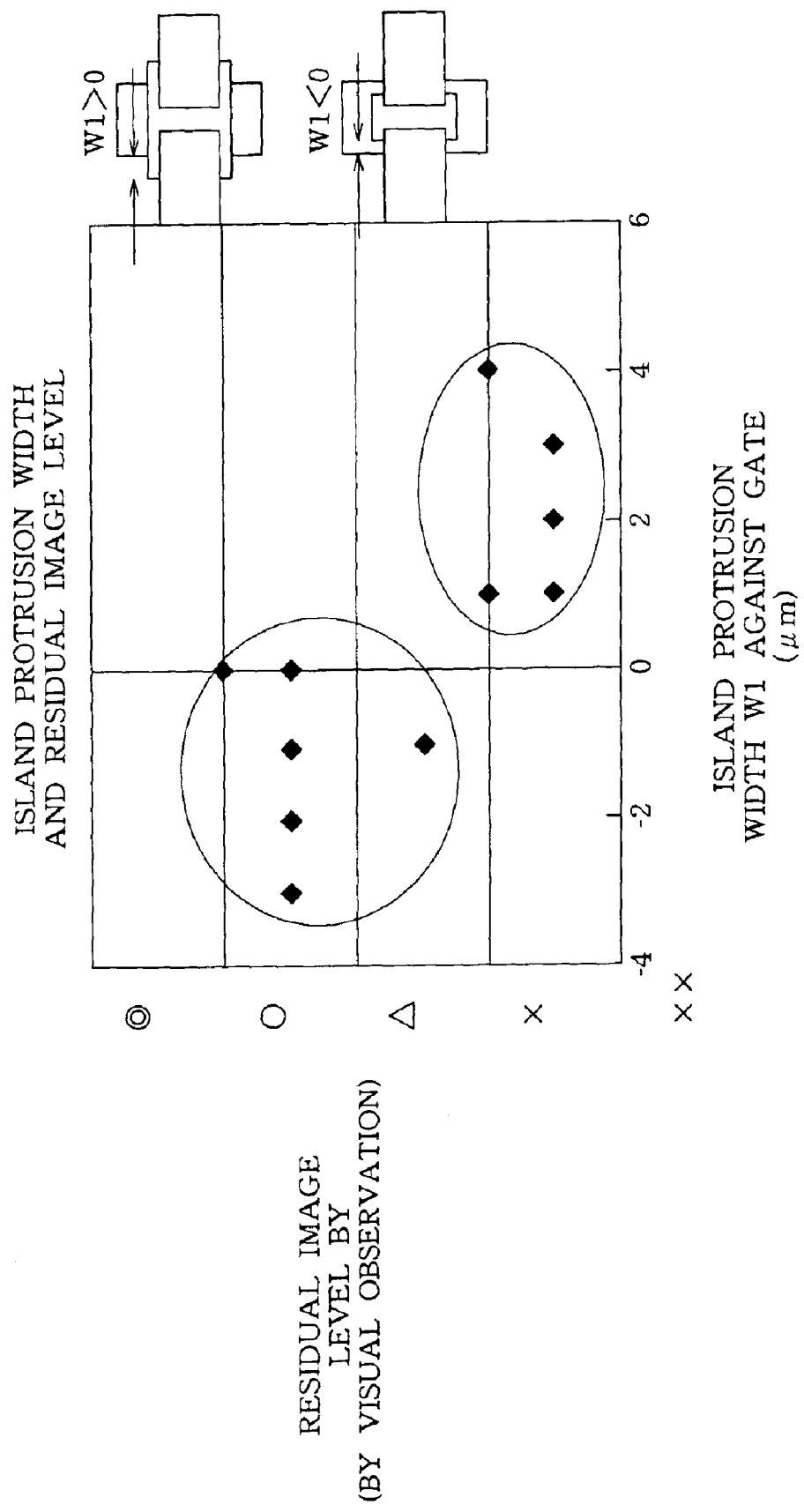
FIG. 15 shows the relationship between the island protrusion width and the residual image level.

FIG. 15 shows the relationship between the island protrusion width and the residual image level based on visual observation. The residual image level is evaluated in five grades: ⊚ represents a level that cannot be observed from the front at all; ○ represents a level that cannot be observed from the from the front but can be slightly viewed from a perspective viewpoint; Δ represents a level that can be slightly viewed from the front; X represents a level that can be viewed from the front; and XX represents a level that can be clearly viewed from the front. If the levels up to Δ are considered to be allowable, it is found that the protrusion width is preferably not greater than 0 micrometers. The residual image level was evaluated by visual observation when the intermediate gradation of luminance is set in after display of a fixed pattern for 24 hours.

Figure 16:
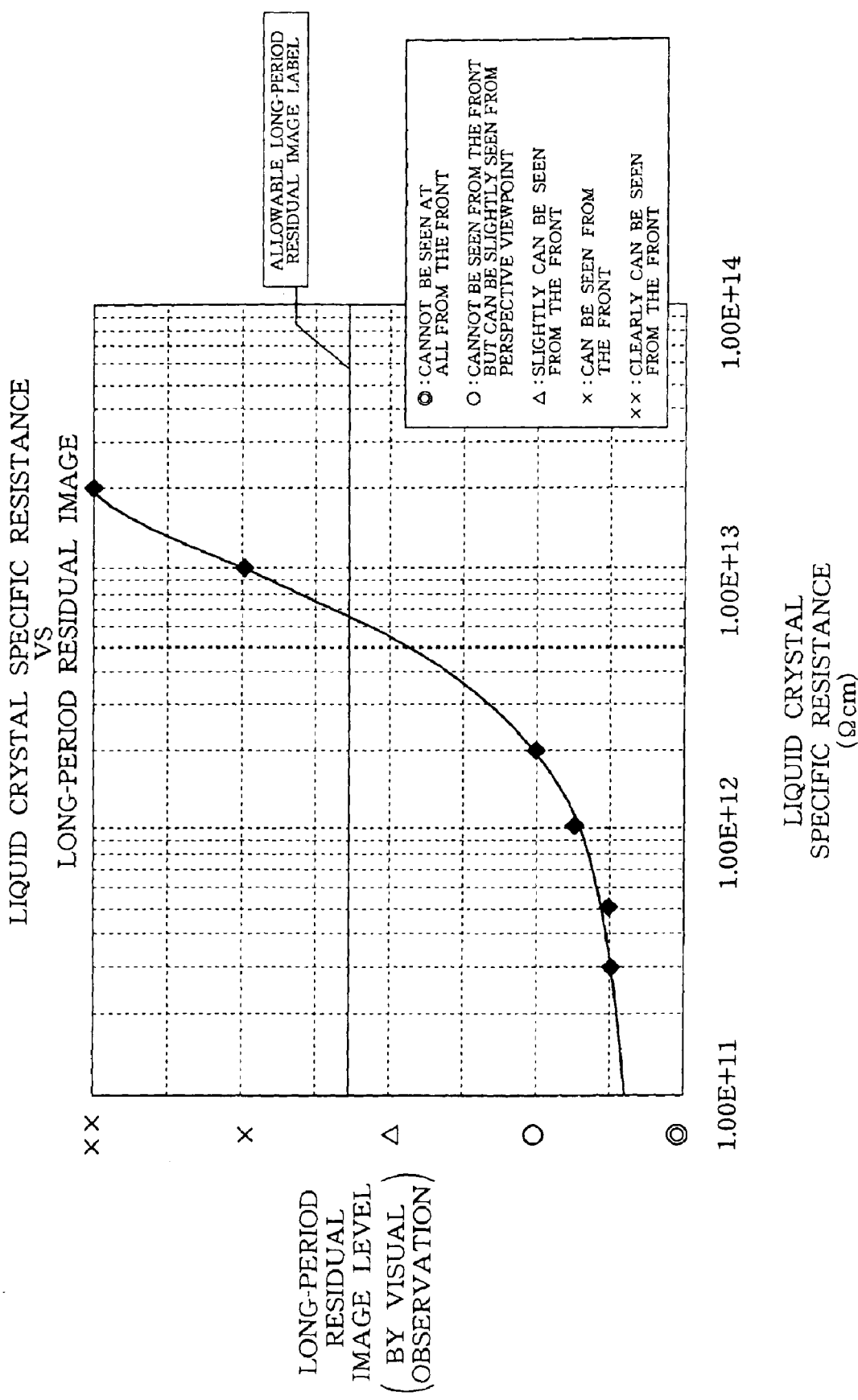
FIG. 16 graphically shows the relationship between the liquid crystal specific resistance and the long-period residual image.

Moreover, FIG. 16 shows the relationship between the liquid crystal specific resistance and the residual image when the semiconductor width in the channel length direction is smaller than the gate electrode width by 0 to 5 micrometers. That is, FIG. 16 graphically shows the residual image change while the liquid crystal resistance is changed.

In this graph, the horizontal axis represents the specific resistance of the liquid crystal and the vertical axis represents the residual image level. If the levels up to Δ are considered to be allowable, the liquid crystal resistance is preferably not greater than $5 \times 10^{12}$ [Ωcm].

Next, explanation will be given on a production method of a liquid crystal display apparatus which facilitates the contour line of the island in the direction vertical to the channel length direction to be on-lined with the contour line of the gate in the direction vertical to the channel length direction. FIG. 8 shows the production steps for it. The right half of the figure shows plan view and the left half of the figure shows cross sectional views about a center line in the shorter side direction.

Firstly, in FIG. 8(a), a gate metal is formed. In FIG. 8(b), a gate insulation film, an amorphous silicon layer, an n-type amorphous silicon layer, and a source drain metal layer are formed on the gate metal. Next, in FIG. 8(c), the gate metal, the gate insulation film, the amorphous silicon layer, the n-type amorphous silicon layer, and the source drain metal layer are selectively etched and patterned according to a pattern of the gate electrode as the scan line in one photoresist step.

Next, in FIG. 8(d), the source drain metal layer is patterned to form the source/drain electrode and with this pattern, a channel etching is performed. After this, in FIG. 8(e), the amorphous silicon layer is selectively etched for patterning an island-shaped amorphous silicon layer. Next, in FIG. 8(f), a passivation insulation film is formed and a source/drain portion for contact is removed. Lastly, in FIG. 8(g), a signal wiring and pixel electrode formation are performed.

Although this production method cannot reduce the number of production steps, in step FIG. 8(c), the amorphous silicon layer and the n-type amorphous silicon layer are pattered with the gate electrode pattern, which enables to form the contour line of the island in the direction vertical to the channel length direction on-lined with the contour line of the gate in the direction vertical to the channel length direction. That is, it is possible to make the semiconductor layer properly in relation to the gate electrode. Moreover, according to the production method, it is possible to eliminate the problem the aforementioned back side exposure method.

Figure 17:
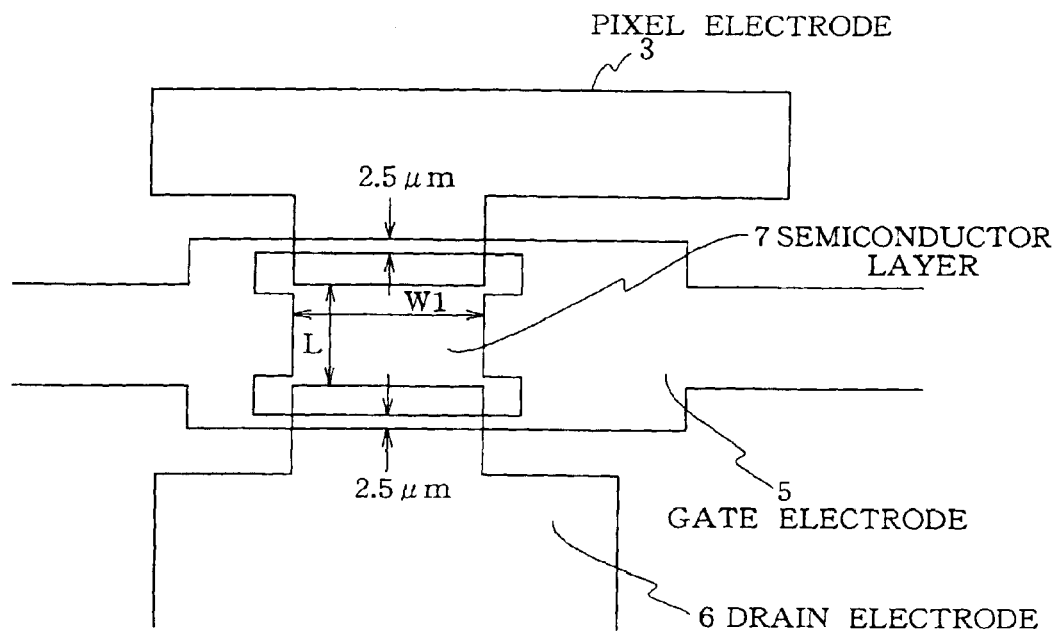
FIG. 17 shows another example of the island configuration according to the first embodiment.
Figure 18:
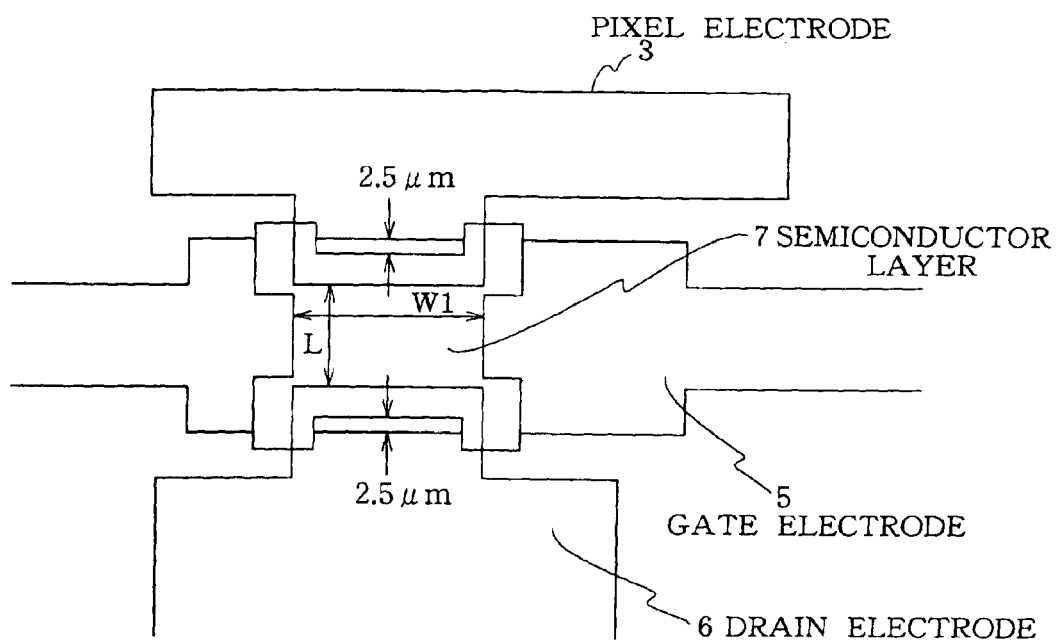
FIG. 18 shows still another example of the island configuration according to the first embodiment.
Figure 19:
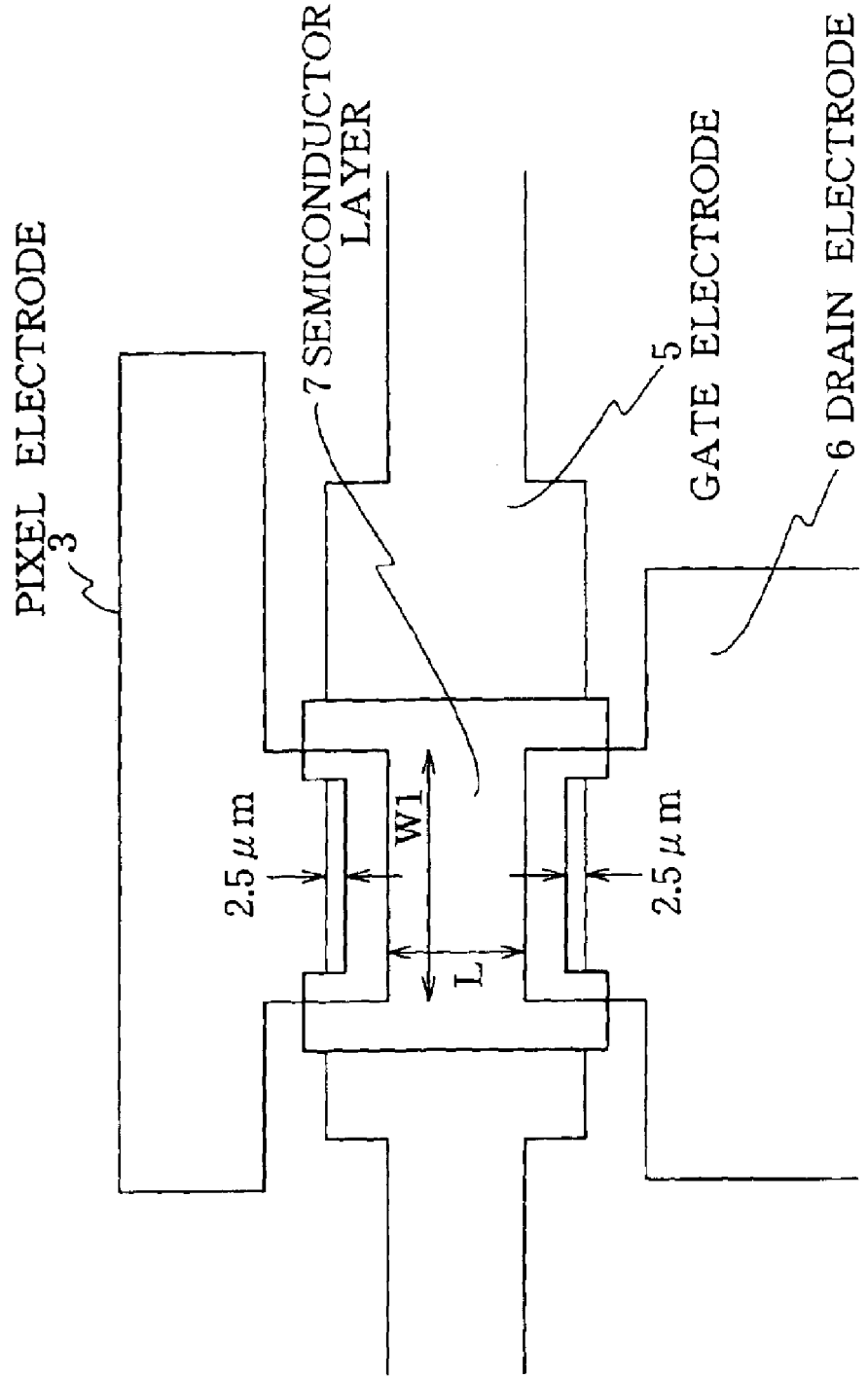
FIG. 19 shows yet another example of the island configuration according to the first embodiment.
Figure 20:
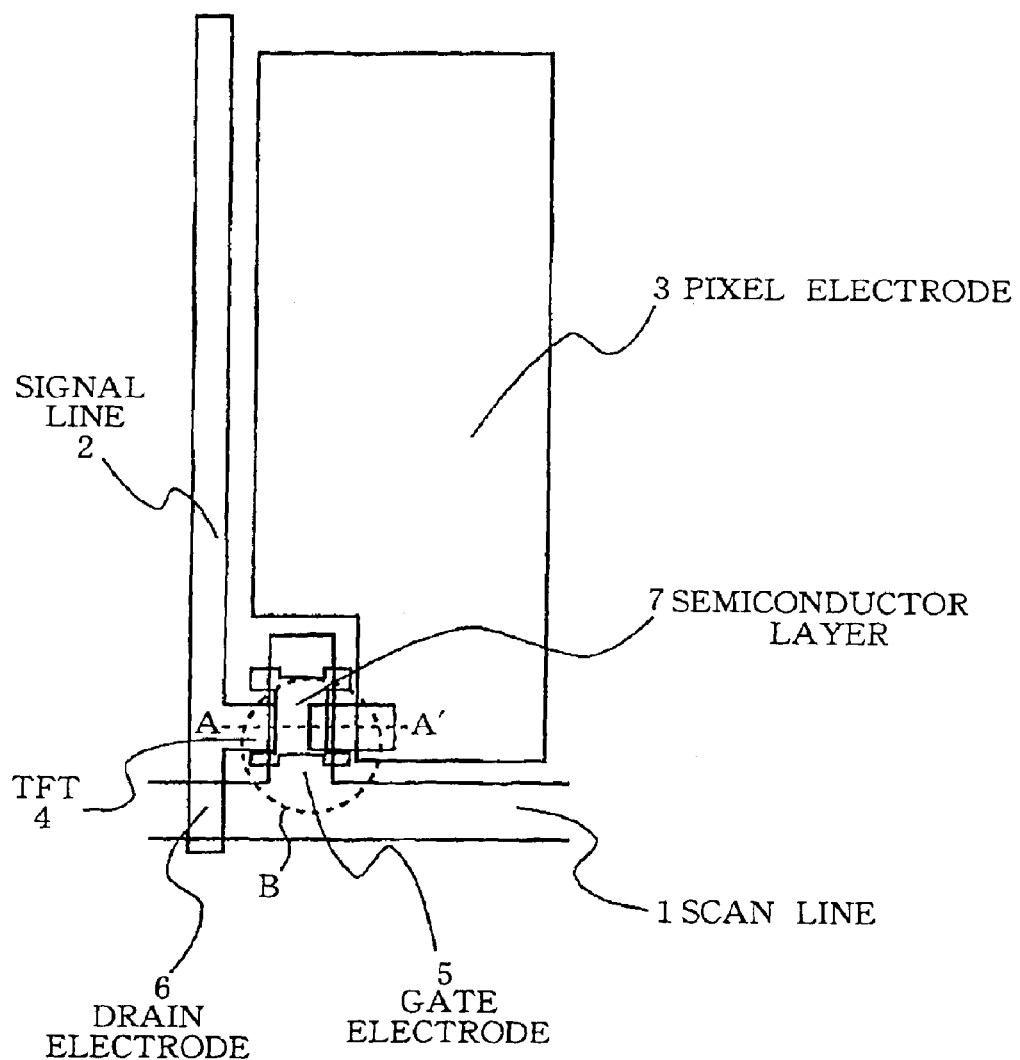
FIG. 20 is an enlarged plan view of a unit pixel of a liquid crystal display apparatus according to a second embodiment of the present invention.
Figure 21:
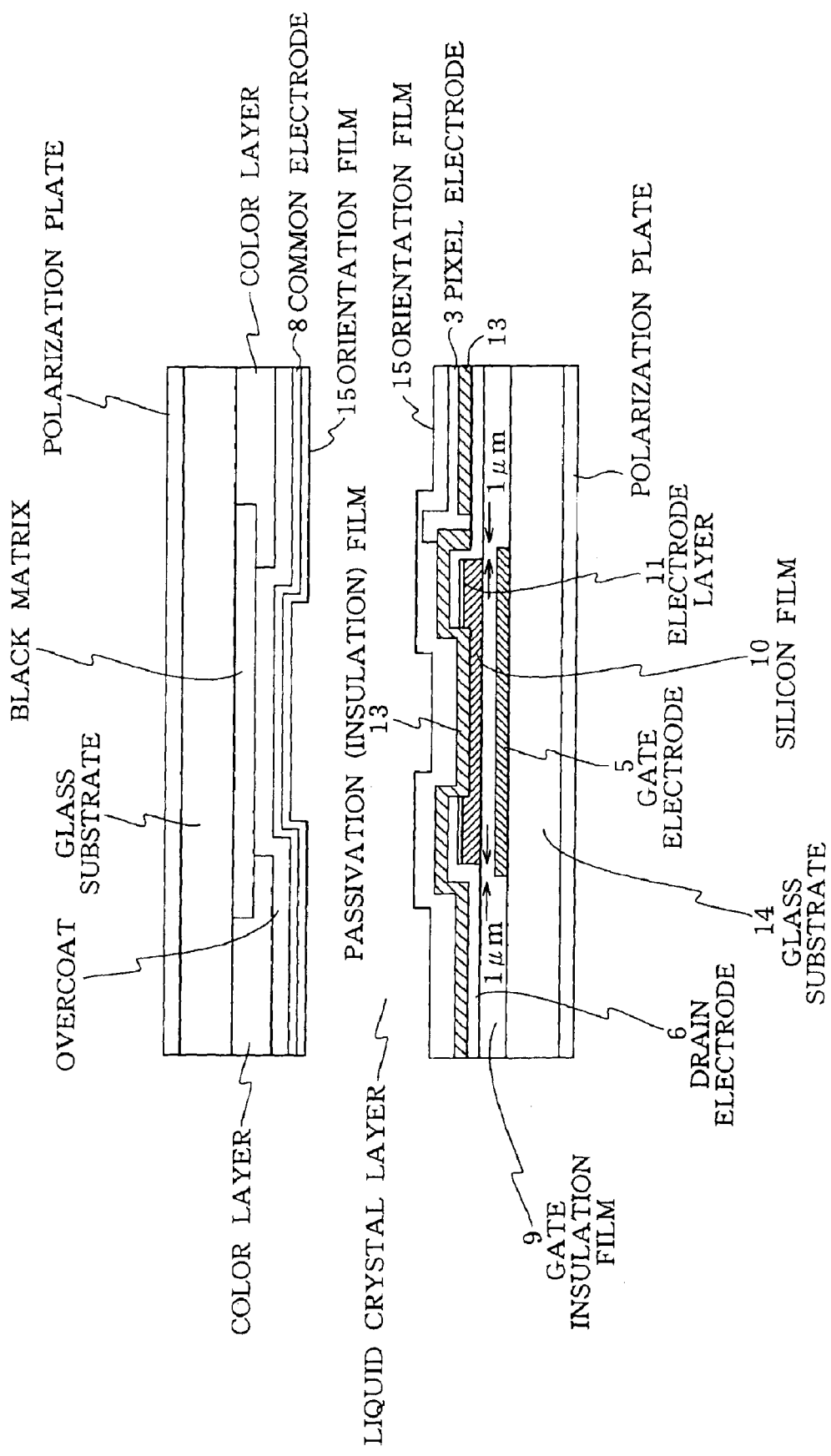
FIG. 21 is a cross sectional view about the line A–A' in FIG. 20.

Next, other embodiments of the island configurations are shown in FIG. 17, FIG. 18, and FIG. 19. These embodiments can further reduce the leak current as compared to the configuration shown in FIG. 13. It should be noted that the configurations of FIG. 17 to FIG. 19 are only examples and the present invention is not to be limited to these configurations.

FIG. 17 shows a configuration of the semiconductor layer 7 in which a center portion of the side along the channel length direction is removed. FIG. 18 shows a configuration of the semiconductor layer 7 in which a portion of the semiconductor layer 7 along the side in the channel length direction is removed and a portion along the side in a direction vertical to the channel length direction is enlarged outside the gate electrode. FIG. 19 shows a configuration of the semiconductor layer 7 in which a portion of the side along a direction vertical to the channel length direction is enlarged outside the gate electrode.

Explanation will be given below on the reason why the leak current can be reduced by these configurations of the semiconductor layer shown in FIG. 17 to FIG. 19.

As shown in FIG. 12(a), the leak current when the gate is off is I2=I3<<I1=I4 considering respective paths. The I1 and I4 are greater because the pixel electrode 3 and the drain electrode 6 are not shaded and more photo carriers are generated on this path. On the other hand, I1 and I4 do not contribute to the ON current.

Accordingly, as shown in FIG. 12(b), when the semiconductor layer portion on I1 and I4 is removed, the OFF current can be reduced, because the paths I1 and I4 are removed, as compared to FIG. 12(a) while maintaining the ON current.

Moreover, as shown in FIG. 12(c), when a portion of the semiconductor is enlarged outside the gate electrode, it is possible to increase the ON current by utilizing the photo carrier generated by the light applied to the enlarged portion.

In the aforementioned liquid crystal display apparatus, the channel portion of the thin film transistor (TFT) is shaded by the gate electrode, thereby suppressing generation of the photo carrier caused by light incident into the semiconductor layer. Accordingly, it is possible to increase the ON/OFF ratio of the switching characteristic. Thus, an appropriate voltage is applied to the white display portion and black display portion, thereby suppressing a residual image and obtaining a high display quality.

Conventionally, when a fixed display pattern of a white and black checker black is applied for 24 hours (residual image test) and then an intermediate gradation is set on, a boundary between patterns remains clear with a clear contrast of the fixed display pattern. However, when the aforementioned configuration of the present invention is applied, switching to the intermediate gradation after the residual image test results in an unclear boundary of the fixed display pattern and no contrast difference.

It should be noted that the present invention makes the width of the semiconductor layer in the channel length direction identical to the gate electrode width in the channel length direction in order to reduce the, residual image generated by a leak current. In the aforementioned embodiments, explanation has been given on the semiconductor layer formed with a width in the channel length direction smaller than the gate electrode width in the channel length direction by 0 to 5 micrometers, considering the positioning margin during production. When the semiconductor layer is recessed than the gate electrode, the gate electrode and the drain electrode/source electrode are overlaid to increase the parasitic capacity, causing flicker on the screen due to the feed-through phenomenon. This flicker should be reduced. To cope with this, considering the positioning margin during production as well as production irregularities, the semiconductor layer recess from the gate electrode is defined to be 5 micrometers at maximum,
[Embodiment 4]

Description will now be directed to a liquid crystal display apparatus according to a forth embodiment of the present invention.

FIG. 13–20 is an enlarged plan view of a unit pixel of an active matrix substrate of a liquid crystal display apparatus according to the forth embodiment. In a region defined by a scan line 1 and a signal line 2 arranged in a matrix shape, a TFT (thin film transistor) 4 and a pixel electrode connected to the TFT 4 are formed. The TFT 4 has a gate electrode 5 on which a semiconductor is formed for forming the TFT via an insulation film (not depicted). Furthermore, thereon, the semiconductor layer 7 is sandwiched by the pixel electrode (source electrode) 3 and a drain electrode 6 formed in the opposing positions. The gate electrode 5 constitutes a part of the scan line and the drain electrode is connected to the signal line 2.

FIG. 14–21 is a partial cross sectional view of a liquid crystal display apparatus including an opposing color filter about the line A–A' of FIG. 13–20. It should be noted that like components are denoted by like reference symbols. A gate electrode 5 is formed on a part of a glass substrate 14. A gate insulation film 9 is formed to cover the gate electrode 5 entirely.

On the gate electrode 5, a gate insulation film 9, a silicon film 10 to serve as a semiconductor layer of a TFT 4, and a silicon film doped with impurities such as phosphorous for ohmic contact with a source/drain electrode are formed, thereby forming an island. This island has a side whose portion along a direction vertical to a channel length direction protrudes outside the gate.

Furthermore, on a part of this island, a drain electrode 6 and a source electrode 16 are formed. After this, a part of the electrode 11 formed from the silicon film doped with impurities is removed, thereby forming a channel portion of the TFT 4. In order to cover the entire region, a passivation film 13 is formed.

After this, a contact hole is formed in the passivation film 13. A pixel electrode 3 is formed on a part of the passivation film 13, and the source electrode 16 and the pixel electrode 3 are electrically connected via the contact hole. Moreover, a common electrode 8 is arranged on the opposing substrate.

Each of the substrates is coated with an orientation film 15 and subjected to lapping for orientating the liquid crystal. The lapping is performed in a direction in such a manner that the opposing substrates are orthogonal to each other.

The pixel electrode 3 and the common electrode 8 are formed so as to sandwich liquid crystal. When a voltage is applied between the pixel electrode 3 and the common electrode 8, as an electric field is generated with a component vertical to the glass substrate 14 so as to drive the liquid crystal.

Figure 22:
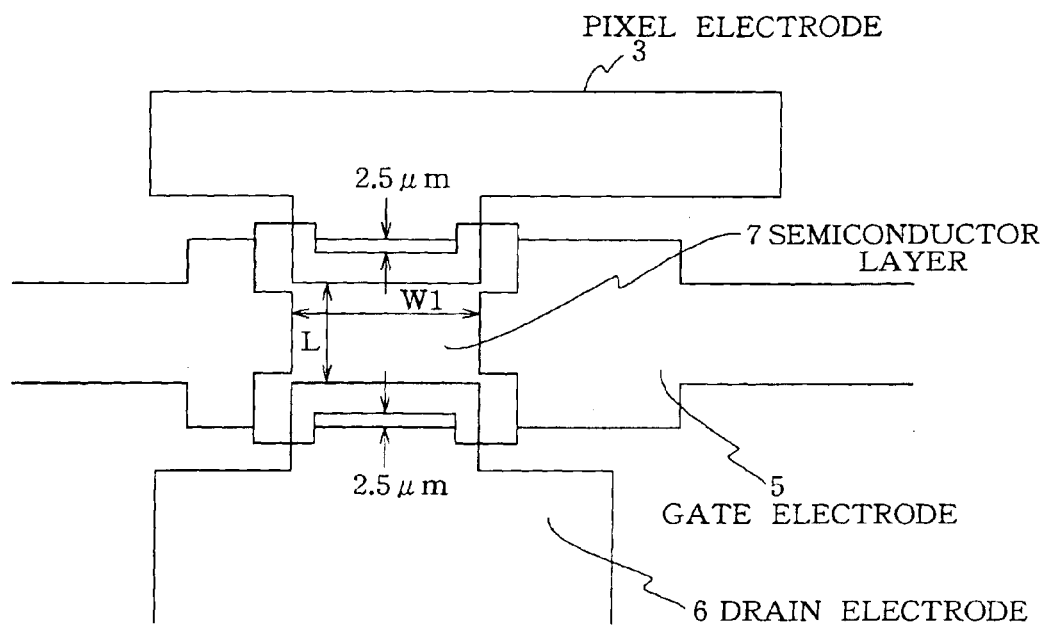
FIG. 22 shows an example of the island configuration according to the second embodiment.

Next, FIG. 22 shows an example of an island configuration according to the second embodiment. FIG. 22 is an enlarged view of the portion defined by a dotted line B in FIG. 20. It should be noted that like components are denoted by like reference symbols.

The semiconductor layer 7 has a side along the channel length direction which is partially removed and a side along a direction vertical to the channel length direction which protrudes outside the gate electrode 5. With this configuration, it has been proven that the leak current is reduced and the display irregularity level is improved.

Figure 23:
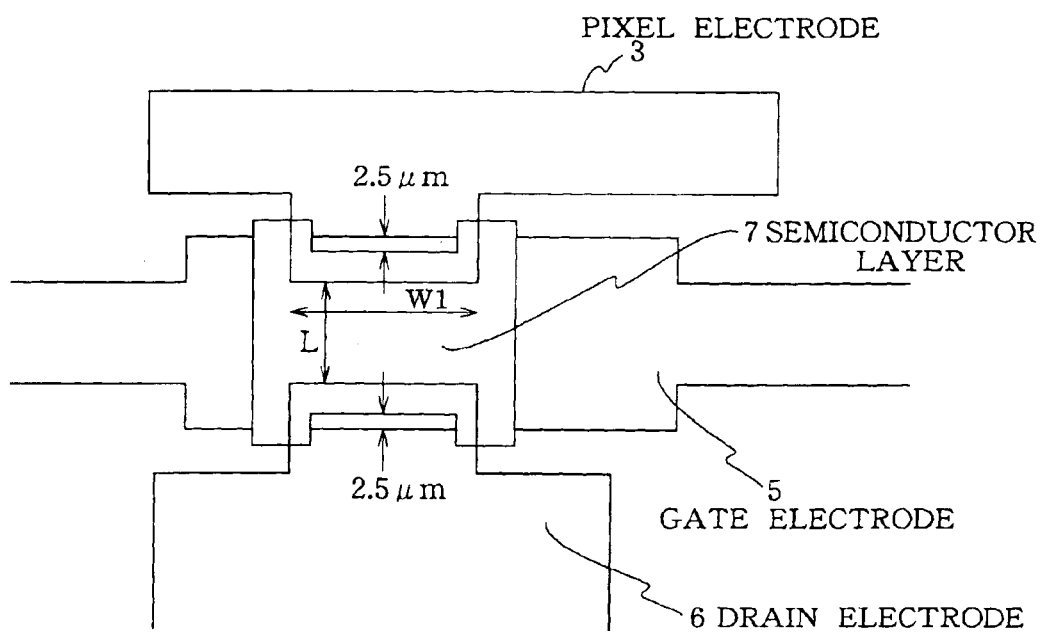
FIG. 23 shows another example of the island configuration according to the second embodiment.
Figure 24:
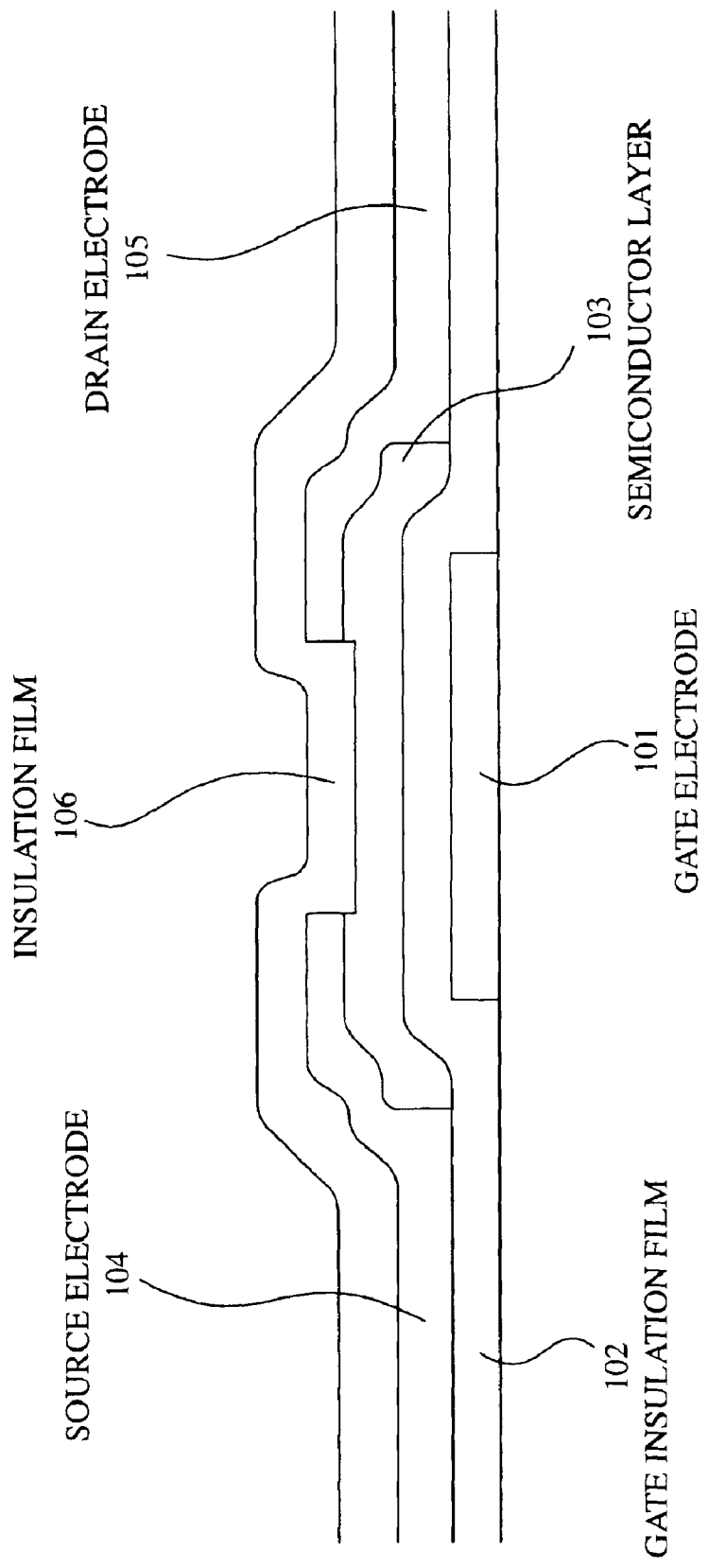
FIG. 24 is a cross sectional view of a TFT element portion of a liquid crystal display apparatus using the conventional IPS method.
Figure 25:
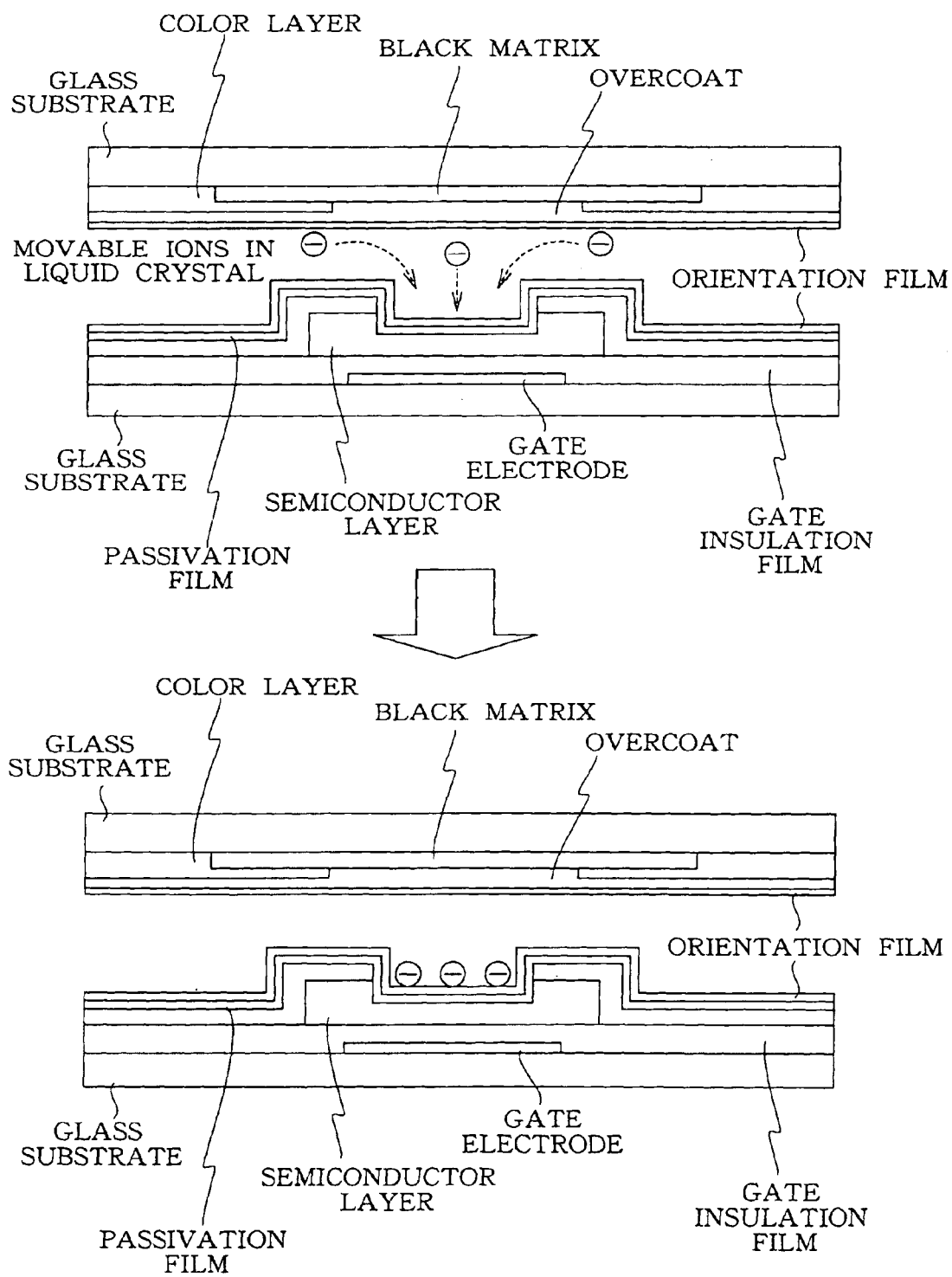
FIG. 25 shows an adhesion model of movable ions in a liquid crystal to the back channel.

Next, FIG. 23 shows another example of the island configuration according to the second embodiment. The semiconductor layer 7 has the side in the direction vertical to the channel length direction which proturudes outside the electrode 5. With this configuration, it has been proven that the leak current is reduced and the display irregularity level is improved.

As has been described above, in the liquid crystal display apparatus according to the present invention, the semiconductor layer is formed witht a width in the channel length direction identical to the gate electrode width in the channel length direction and accordingly, the back light emitted from the back light and incident into the liquid crystal display apparatus does not come directly into the semiconductor layer. This enables to significantly reduce the leak current of the channel portion and drastically reduce the residual image.

Moreover, in the present invention, since the semiconductor layer is formed with a width in the channel length direction identical to the gate electrode width in the channel length direction, it is possible to obtain a comparatively small gate/source capacitance or gate/drain capacitance (parasitic capacitance), thereby reducing the field through voltage. This can assure a preferable display quality of the liquid crystal display apparatus.

Moreover, in the liquid crystal display apparatus production method according to the present invention, the semiconductor layer and the gate electrode are formed in the photoresist step using the same mask. This enables to form the semiconductor layer properly in relation to the gate electrode. Thus, it is possible to solve the aforementioned problem involved in the conventional product method.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-364544 (Filed on Dec. $22^{nd}$, 1999) and Japanese Patent Application No. 2000-321784 (Filed on Oct. $20^{th}$, 2000) including specification, claims, drawings and summary are incorporated herein by reference in its entirety.

What is claimed is:

1. A liquid crystal display apparatus of a lateral direction electric field drive type comprising:
    an array substrate including a plurality of TFTs each having a gate electrode, a gate insulation film, a semiconductor layer, and a source electrode/drain electrode formed on a transparent substrate; and
    an opposing substrate arranged so as to oppose to the array substrate; wherein a boundary of the semiconductor layer includes: both a portion formed inside an area where the gate electrode and the source electrode or the drain electrode of the TFT overlap, and a portion formed outside the gate electrode and wherein a portion of an edge of the semiconductor layer is formed inside the area where the gate electrode and the source electrode or the drain electrode of the TFT overlap.

2. The liquid crystal display apparatus as claimed in claim 1, wherein the boundary of the semiconductor layer of the TFT is so formed that a portion situated inside the gate electrode is formed on a center part of an overlapping area of the gate electrode and the source electrode or the drain electrode, and portions situated outside the gate electrode are formed on parts corresponding to both ends of the overlapping area.

3. A liquid crystal display apparatus of a lateral direction electric field drive type comprising:

an array substrate including a plurality of TFTs each having a gate electrode, a gate insulation film, a semiconductor layer, and a source electrode/drain electrode formed on a transparent substrate: and an opposing substrate arranged so as to oppose to the array substrate; wherein a boundary of the semiconductor layer includes: both a portion formed inside an area where the gate electrode and the source electrode or the drain electrode of the TFT overlap, and a portion formed outside the gate electrode and wherein the semiconductor layer of the TFT is shaped as a concavity by removing a portion of a side which does not overlap the source electrode or the drain electrode.

4. A liquid crystal display apparatus comprising:

an array substrate including a plurality of TFTs each having a gate electrode, a gate insulation film, a semiconductor layer, and a source electrode/drain electrode formed on a transparent substrate;

an opposing substrate arranged so as to oppose to the array substrate; and a common electrode arranged on a side of the opposing substrate; wherein a boundary of the semiconductor layer includes: both a portion formed inside an area where the gate electrode and the source electrode or the drain electrode of the TFT overlap, and a portion formed outside the gate electrode and wherein a portion of an edge of the semiconductor layer is formed inside the area where the gate electrode and the source electrode or the drain electrode of the TFT overlap.

5. The liquid crystal display apparatus as claimed in claim 4, wherein the boundary of the semiconductor layer of the TFT is so formed that a portion situated inside the gate electrode is formed on a center part of an overlapping area of the gate electrode and the source electrode, and portions situated outside the gate electrode are formed on parts corresponding to both ends of the overlapping area.

6. A liquid crystal display apparatus comprising:

an array substrate including a plurality of TFTs each having a gate electrode, a gate insulation film, a semiconductor layer, and a source electrode/drain electrode formed on a transparent substrate;

an opposing substrate arranged so as to oppose to the array substrate; and a common electrode arranged on a side of the opposing substrate; wherein a boundary of the semiconductor layer includes: both a portion formed inside an area where the gate electrode and the source electrode or the drain electrode of the TFT overlap, and a potion formed outside the gate electrode and wherein the semiconductor layer of the TFT is shaped as a concavity by removing a portion of a side which does not overlap the source electrode or the drain electrode.

7. The liquid crystal display apparatus as claimed in claim 3, wherein the boundary of the semiconductor layer of the TFT is so formed that a portion situated inside the gate electrode is formed on a center part of an overlapping area of the gate electrode and the source electrode or the drain electrode, and portions situated outside the gate electrode are formed on parts corresponding to both ends of the overlapping area.

8. The liquid crystal display apparatus as claimed in claim 6, wherein the boundary of the semiconductor layer of the TFT is so formed that a portion situated inside the gate electrode is formed on a center part of an overlapping area of the gate electrode and the source electrode, and portions situated outside the gate electrode are formed on parts corresponding to both ends of the overlapping area.

* * * * *